United States Patent
Wang et al.

(10) Patent No.: US 9,411,862 B1
(45) Date of Patent: Aug. 9, 2016

(54) SYSTEMS AND METHODS FOR DYNAMIC SHARDING OF HIERARCHICAL DATA

(71) Applicant: Google Inc., Mountain View, CA (US)

(72) Inventors: Jue Wang, Kirkland, WA (US); Wei Shao, Kirkland, WA (US); Scott Gasch, Kirkland, WA (US)

(73) Assignee: Google Inc., Mountain View, CA (US)

( * ) Notice: Subject to any disclaimer, the term of this patent is extended or adjusted under 35 U.S.C. 154(b) by 269 days.

(21) Appl. No.: 14/095,293

(22) Filed: Dec. 3, 2013

(51) Int. Cl.
*G06F 17/30* (2006.01)

(52) U.S. Cl.
CPC .............................. *G06F 17/30545* (2013.01)

(58) Field of Classification Search
CPC combination set(s) only.
See application file for complete search history.

(56) References Cited

U.S. PATENT DOCUMENTS

| | | | |
|---|---|---|---|
| 7,890,541 B2 | 2/2011 | Teng et al. | |
| 8,166,045 B1 | 4/2012 | Mazumdar et al. | |
| 8,234,280 B1 | 7/2012 | Mayle et al. | |
| 2010/0161492 A1* | 6/2010 | Harvey | G06Q 10/0639 705/50 |
| 2010/0241629 A1 | 9/2010 | Tatemura et al. | |
| 2011/0282832 A1 | 11/2011 | Rishel et al. | |
| 2013/0110961 A1* | 5/2013 | Jadhav | G06F 15/167 709/213 |
| 2014/0032525 A1* | 1/2014 | Merriman | G06F 17/30283 707/713 |
| 2014/0237090 A1* | 8/2014 | Lassen | H04L 41/00 709/223 |
| 2014/0330785 A1* | 11/2014 | Isherwood | G06F 11/1446 707/640 |

* cited by examiner

*Primary Examiner* — Shyue Jiunn Hwa
(74) *Attorney, Agent, or Firm* — Fish & Richardson P.C.

(57) ABSTRACT

A method for serving a request for hierarchical data includes receiving, at a processing circuit, a request for hierarchical data stored in one or more databases. The request includes an indication of a particular data hierarchy. The method further includes identifying, by the processing circuit, one or more entity count records corresponding to the particular data hierarchy. The entity count records indicate a distribution of the hierarchical data within the data hierarchy. The method further includes splitting the request for hierarchical data into a plurality of sharded requests based on the distribution of the hierarchical data indicated by the one or more entity count records, assigning the plurality of sharded requests to one or more processing sites for processing at least a subset of the sharded requests in parallel, and reporting a combined result of processing the plurality of sharded requests.

19 Claims, 6 Drawing Sheets

SYSTEMS AND METHODS FOR DYNAMIC SHARDING OF HIERARCHICAL DATA

BACKGROUND

In a computerized content delivery network, a content server typically selects a content item to display in conjunction with an electronic resource when the resource is viewed by a user. For example, the content item may be an advertisement and the electronic resource may be a webpage. The content server can use a variety of selection criteria to select a content item to display. For example, the content server may select a content item if the keywords associated with the content item match the subject matter of the electronic resource (e.g., same topic, same theme, etc.) and/or if the keywords associated with the content item match the established interests of the user viewing the resource.

A content provider (e.g., an advertiser) can interact with the content server via a management interface to add, remove, or change the keywords associated with content items that are managed by the content provider. The management interface can also be used to adjust other parameters affecting the distribution of the managed content items (e.g., ad group parameters, ad campaign parameters, bids parameters, etc.).

In a large content delivery network, it is not uncommon for a content provider to manage millions of content items having tens of millions or even hundreds of millions of keywords associated therewith. Due to the online nature of a content delivery network, it is often necessary to read through all of this data quickly to serve a request. The sheer scale of the data often mandates parallel processing, a prerequisite of which is a mechanism to split the large data set into smaller chunks.

One traditional technique for splitting a data set into chunks is known as static sharding. With static sharding, a database is divided into multiple independent chunks or shards according to a predefined and fixed distribution scheme. Static sharding does not handle different data distributions well and does not adapt to changes in the distribution of a data set. This can lead to unbalanced shards. For example, some shards may end up with significantly more data than other shards, thereby reducing the efficiency of processing the various shards in parallel. It is difficult and challenging to provide a fast and efficient mechanism for searching and/or processing data at a large scale without sacrificing adaptability.

SUMMARY

One implementation of the present disclosure is a method for serving a request for hierarchical data. The method includes receiving, at a processing circuit, a request for hierarchical data stored in one or more databases. The request includes an indication of a particular data hierarchy. The method further includes identifying, by the processing circuit, one or more entity count records corresponding to the particular data hierarchy. The entity count records indicate a distribution of the hierarchical data within the data hierarchy. The method further includes splitting the request for hierarchical data into a plurality of sharded requests based on the distribution of the hierarchical data indicated by the one or more entity count records, assigning the plurality of sharded requests to one or more processing sites for processing at least a subset of the sharded requests in parallel, and reporting a combined result of processing the plurality of sharded requests.

In some implementations, the data hierarchy represents an account associated with a content provider and comprises at least one of a set of keywords and a set of content items associated with the content provider.

In some implementations, the method further includes assigning the hierarchical data to a plurality of data shards based on the distribution of the hierarchical data indicated by the one or more entity count records. Each of the sharded requests may correspond to one of the plurality of data shards.

In some implementations, each of the entity count records corresponds to a node of the data hierarchy and includes an indication of a number of data entries at one or more lower levels the data hierarchy within the corresponding node.

In some implementations, the one or more entity count records include a top level entity count record including an indication of a total number of data entries at a lowest level of the data hierarchy and an indication of a number of nodes at each lower level of the data hierarchy other than the lowest level.

In some implementations, the method further includes storing in an active memory of the processing circuit an entity count record associated with a top level node of the data hierarchy and a plurality of entity count records associated with one or more lower level nodes of the data hierarchy. The method may further include periodically updating the entity count records stored in the active memory of the processing circuit to reflect a current distribution of the hierarchical data.

In some implementations, the method further includes attaching a timestamp to each of the plurality of sharded requests. The timestamp may indicate a version of the hierarchical data to use in processing the request.

In some implementations, splitting the request for hierarchical data into a plurality of sharded requests includes determining a level of the data hierarchy at which to split the request, identifying a number of nodes of the data hierarchy at the determined level using the entity count records, and splitting the request for hierarchical data into a plurality of sharded requests, each of the sharded requests corresponding to one of the identified nodes of the data hierarchy.

In some implementations, determining the level of the data hierarchy at which to split the request includes determining a target number of shards into which to split the hierarchical data, using the entity count records to identify a level of the data hierarchy having a number of nodes closest to the target number of shards, and determining to split the request at the identified level of the data hierarchy.

In some implementations, determining the level of the data hierarchy at which to split the request includes using the entity count records to identify a first set of nodes at a first level of the data hierarchy and a first distribution of the hierarchical data between the first set of nodes, using the entity count records to identify a second set of nodes at a second level of the data hierarchy and a second distribution of the hierarchical data between the second set of nodes, and determining to split the request at either the first level of the data hierarchy or the second level of the data hierarchy based on which of the first distribution and the second distribution is most evenly distributed.

In some implementations, splitting the request for hierarchical data into a plurality of sharded requests further includes recursively splitting a sharded request into a plurality of sub-sharded requests in response to a determination that a sharded request is associated with a shard that has a size exceeding a maximum threshold value.

In some implementations, splitting the request for hierarchical data into a plurality of sharded requests further includes combining two or more sharded requests into a single sharded request in response to a determination that at least one of the two or more sharded requests is associated with a shard that has a size less than a minimum threshold value.

Another implementation of the present disclosure is a system for serving a request for hierarchical data. The system includes a processing circuit configured to receive a request for hierarchical data stored in one or more databases. The request includes an indication of a particular data hierarchy. The processing circuit is further configured to identify one or more entity count records corresponding to the particular data hierarchy. The entity count records indicating a distribution of the hierarchical data within the data hierarchy. The processing circuit is further configured to split the request for hierarchical data into a plurality of sharded requests based on the distribution of the hierarchical data indicated by the one or more entity count records, assign the plurality of sharded requests to one or more processing sites for processing at least a subset of the sharded requests in parallel, and report a combined result of processing the plurality of sharded requests.

In some implementations, each of the entity count records corresponds to a node of the data hierarchy and includes an indication of a number of data entries at a lowest level of the data hierarchy within the corresponding node.

In some implementations, the processing circuit is further configured to store in an active memory of the processing circuit an entity count record associated with a top level node of the data hierarchy and a plurality of entity count records associated with one or more lower level nodes of the data hierarchy. The processing circuit may further be configured to periodically update the entity count records stored in the active memory of the processing circuit to reflect a current distribution of the hierarchical data.

In some implementations, splitting the request for hierarchical data into a plurality of sharded requests includes determining a target number of shards into which to split the hierarchical data, using the entity count records to identify a level of the data hierarchy having a number of nodes closest to the target number of shards, and splitting the request at the identified level of the data hierarchy.

In some implementations, splitting the request for hierarchical data into a plurality of sharded requests includes determining a level of the data hierarchy on which to split the request, identifying a number of nodes of the data hierarchy at the determined level, and splitting the request for hierarchical data into a plurality of sharded requests. Each the sharded requests may correspond to one of the identified nodes of the data hierarchy.

Another implementation of the present disclosure is a system for serving a request for hierarchical data. The system includes a dynamic sharding service configured to store one or more entity count records in an active memory of the dynamic sharding service. Each of the entity count records corresponds to a node of a data hierarchy and includes an indication of a number of data entries at one or more lower levels of the data hierarchy within the corresponding node. The dynamic sharding service is configured to split a request for data represented by the data hierarchy into a plurality of sharded requests based on a distribution of the data indicated by the one or more entity count records stored in active memory.

In some implementations, the dynamic sharding service is further configured to periodically update the entity count records stored in the active memory of the dynamic sharding service to reflect a current distribution of the hierarchical data.

In some implementations, splitting the request into a plurality of sharded requests includes determining a target number of shards into which to split the hierarchical data, using the entity count records to identify a level of the data hierarchy having a number of nodes closest to the target number of shards, and splitting the request for hierarchical data into a plurality of sharded requests. Each of the sharded requests may correspond to one of the nodes of the identified level of the data hierarchy.

Those skilled in the art will appreciate that the summary is illustrative only and is not intended to be in any way limiting. Other aspects, inventive features, and advantages of the devices and/or processes described herein, as defined solely by the claims, will become apparent in the detailed description set forth herein and taken in conjunction with the accompanying drawings.

DETAILED DESCRIPTION

Figure 1:
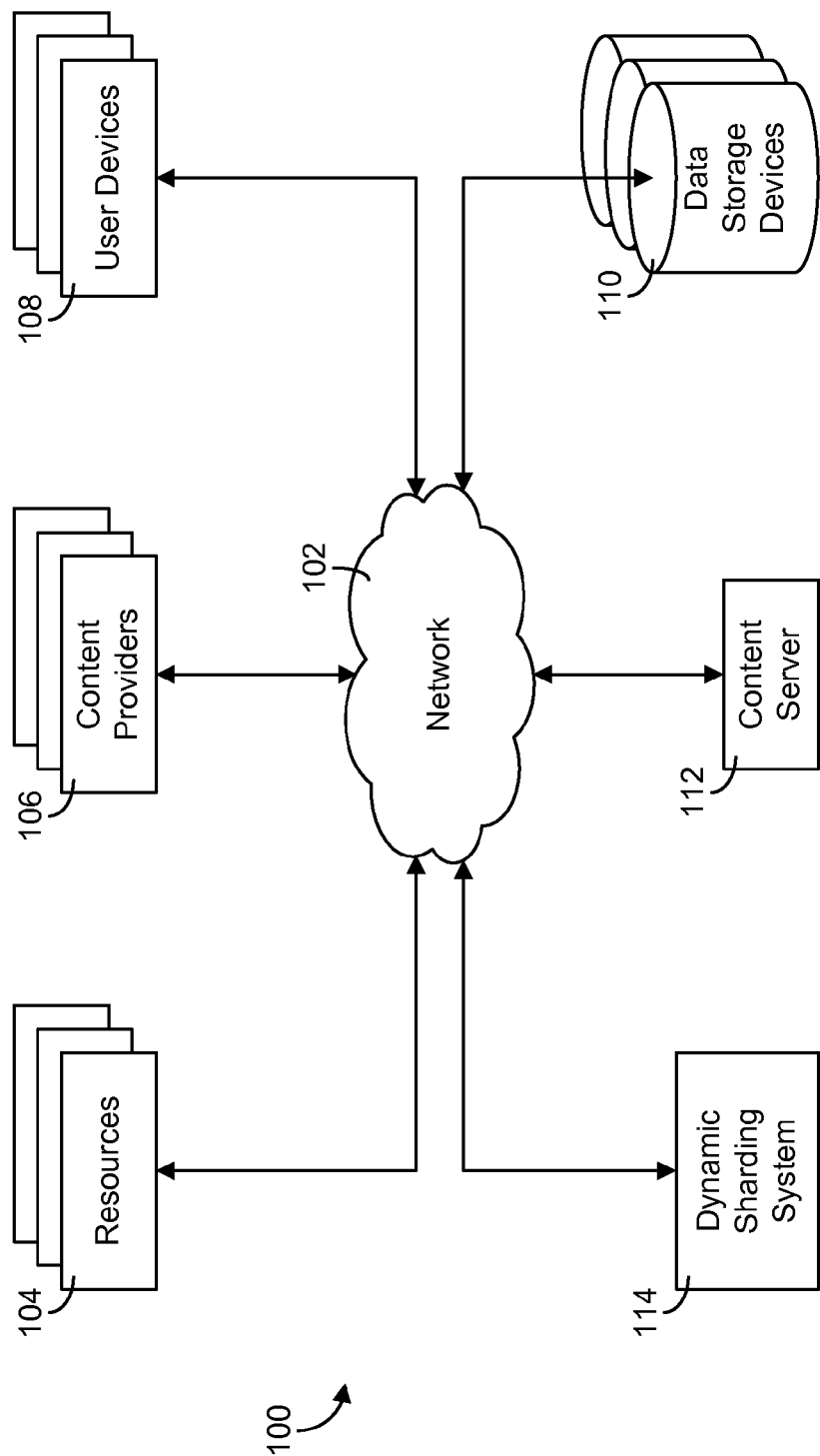
FIG. 1 is block diagram of a computer system including a dynamic sharding system configured to split a request for hierarchical data into a plurality of sharded requests based on the hierarchical distribution of the requested data, according to a described implementation.

Referring generally to the FIGURES, systems and methods for dynamic sharding of hierarchical data and components thereof are shown, according to a described implementation. The systems and methods described herein may be used to dynamically and adaptively split a data set into multiple smaller chunks (i.e., "shards") to facilitate parallel processing thereof. The process by which the data set is split into smaller shards is referred to as dynamic sharding. The systems and methods of the present disclosure use the hierarchical structure of a database to split the data into multiple shards.

In many real-world applications, data sets are often of huge scale. For example, in a large content delivery network, it is not uncommon for a single content provider to manage millions of content items having tens of millions or even hundreds of millions of keywords associated therewith. Services standing in front of these data may need to read through all the data to serve a request (e.g., a keyword request, a search request, a request for content, etc.). In an online environment, it is often important that the request be served quickly. By splitting the data into multiple shards, the shards can be processed in parallel, thereby reducing the latency in serving a request.

Many data sets are hierarchical. For example, in an online content delivery network, keyword data and/or content item data may be organized according to the following hierarchy:

Content Provider→Engine Account→Campaign→Adgroup→Keywords/Content Items

However, the distribution of data within the hierarchy is not always regular or uniform. For example, one content provider with one hundred million keywords could have one thousand campaigns (e.g., one hundred thousand keywords per campaign) whereas another content provider with one hundred million keywords could have one million campaigns (e.g., one hundred keywords per campaign). Additionally, some branches of the hierarchy may have more data than others. For example, one adgroup could have one million keywords associated therewith whereas another adgroup could have only one hundred keywords. The systems and methods of the present disclosure can adapt to various data distributions and can compensate for changes in data distribution over time (e.g., a content provider adding keywords, adgroups, campaigns, or otherwise changing the hierarchical distribution).

The systems and methods described herein use the hierarchical structure of the database to split the data into multiple shards. In some implementations, the hierarchical structure of the database is summarized by one or more entity count records. An entity count record may correspond to a particular node of the hierarchy and may provide a listing of a number of items (e.g., nodes, keywords, content items, etc.) at each lower level of the hierarchy within the corresponding node. The entity count records for the upper levels of the hierarchy can be stored in memory without consuming a prohibitively large amount of memory. The entity count records can be generated by a map-reduce-type process and refreshed periodically to provide an accurate indication of the current hierarchical data distribution.

The dynamic sharding system may use the entity count records to determine on which level of the hierarchy the database should be split. For example, the dynamic sharding system may determine that the database should be split on the engine account level, the campaign level, the adgroup level, or any other hierarchical level when assigning the data to various shards. The dynamic sharding system may also use the entity count records to determine whether to recursively split on a node (e.g., splitting a node into multiple shards if the node is too large) and/or whether to group multiple nodes (e.g., combining data within several nodes into a single shard if the nodes are too small).

The dynamic sharding system can split a request into a plurality of sharded requests by reading data (e.g., from a real database stored on a hard disk) at only the level at which the database is split (and possibly for a subset of the lower levels if a split is recursive). These data are much smaller than the overall data to read for the entire request. For example, to shard a keyword request, the dynamic sharding system may determine that the database should be sharded at the campaign level. If the campaign level includes one thousand campaigns (e.g., as indicated by the top level entity count record), the dynamic sharding system may generate one thousand shards (e.g., one shard for each campaign). The dynamic sharding system read only the one thousand campaigns and not any of the data at lower levels of the hierarchy to split the original large request into a plurality of smaller sharded requests. If the shards are distributed across different servers, the shards can be processed in parallel to expedite processing. In some implementations, the rate at which a large request is processed using the systems and methods described herein is approximately ten times faster than traditional parallel processing techniques.

Additional metadata information such as the time stamp when the original large request is received can be attached to the sharded requests produced. The timestamp can ensure that the various shards are producing consistent data by specifying a reference time that will be reflected in the sharded results (e.g., by specifying a version of the hierarchical data to read from a data store when processing the request). Each sharded request may produce a result that is accurate at the time the original request is received, thereby eliminating the potential for inconsistent results in the event that the hierarchical data changes between the time of the original request and the times that the sharded results are produced (e.g., keywords being reclassified from one branch of the hierarchy to another).

In some implementations, the dynamic sharding process can be applied recursively. In the above example, each server that receives a shard can further split the sharded request into smaller requests (e.g., one per adgroup). Each of the smaller requests can be processed on different machines and/or using multiple threads of a single machine for high throughput. By further splitting sharded requests into multiple smaller requests, the rate at which the request is processed can significantly increased (e.g., twenty times faster for large requests).

Other aspects, inventive features, and advantages of the systems and methods described herein will become apparent in the detailed description set forth below taken in conjunction with the accompanying drawings.

It should be noted that although the systems and methods of the present disclosure are described in the context of an online content distribution network, the teachings of the present disclosure can readily be applied to other contexts and used in other implementations. It is anticipated that the systems and methods of the present disclosure can be used to process any type of hierarchical data (e.g., business organization data, building management system data, inventory data, accounting data, financial data, entity data, scientific data, sensor data, statistical data, etc.) or any other type of data that can be represented using a hierarchical organization scheme. The systems and methods described herein may be used as an alternative or supplement to any system or process that uses static database sharding, horizontal partitioning, map-reduce processing, or other techniques to partition a database into smaller chunks and/or process data in parallel.

Referring now to FIG. 1, a block diagram of a computer system 100 is shown, according to a described implementation. In brief overview, computer system 100 is shown to include a network 102, resources 104, content providers 106, user devices 108, data storage devices 110, a content server 112, and a dynamic sharding system 114. Computer system 100 may facilitate communication between resources 104, content providers 106, and user devices 108. For example, user devices 108 may request and receive resource content (e.g., web pages, documents, etc.) from resources 104 via network 102. In some implementations, resources 104 include content item slots for presenting third-party content items from content providers 106. When resource content is viewed by user devices 108, third-party content items from content providers 106 may be delivered and presented in the content slots of resources 104.

Computer system 100 may also facilitate communication between content providers 106, content server 112, and dynamic sharding system 114. Content providers 106 may interact with content server 112 (e.g., via a front end management interface) to add, remove, or change various keywords and/or content items managed by content providers 106. The management interface can also be used to adjust other parameters affecting the distribution of the managed content items (e.g., ad group parameters, ad campaign parameters, bids parameters, etc.). Content providers 106 may submit a request to content server 112 (e.g., a keyword request, a search request, a request for a report, etc.). Content server 112 may interact with dynamic sharding system 114 to split the original request into multiple sharded requests. The sharded requests may be processed in parallel (e.g., by multiple processing sites, by multiple machines, by multiple threads of a single machine, etc.). The results of the sharded requests may be merged (e.g., written to a table or database, used to generate a report, etc.) and provided to content providers 106 as a result of the original request.

Still referring to FIG. 1, computer system 100 is shown to include a network 102. Network 102 may be a local area network (LAN), a wide area network (WAN), a cellular network, a satellite network, a radio network, the Internet, or any other type of data network or combination thereof. Network 102 may include any number of computing devices (e.g., computers, servers, routers, network switches, etc.) configured to transmit, receive, or relay data. Network 102 may further include any number of hardwired and/or wireless connections. For example, user devices 108 may communicate wirelessly (e.g., via WiFi, cellular, radio, etc.) with a transceiver that is hardwired (e.g., via a fiber optic cable, a CAT5 cable, etc.) to a computing device of network 102.

Computer system 100 is shown to include resources 104. Resources 104 may include any type of information or data structure that can be provided over network 102. In some implementations, resources 104 may be identified by a resource address associated with each resource (e.g., a uniform resource locator (URL)). Resources 104 may include web pages (e.g., HTML web pages, PHP web pages, etc.), word processing documents, portable document format (PDF) documents, images, video, programming elements, interactive content, streaming video/audio sources, or other types of electronic information. Resources 104 may include content (e.g., words, phrases, images, sounds, etc.) having embedded information (e.g., meta-information embedded in hyperlinks) and/or embedded instructions. Embedded instructions may include computer-readable instructions (e.g., software code, object script, etc.) which are executed by user devices 108 (e.g., by a web browser running on user devices 108).

In some implementations, resources 104 may include content slots for presenting third-party content items. For example, resources 104 may include one or more inline frame elements (e.g., HTML "iframe" elements, <iframe> . . . </iframe>) for presenting third-party content items from content providers 106. An inline frame can be the "target" frame for links defined by other elements and can be selected by user agents (e.g., user devices 108, a web browser running on user devices 108, etc.) as the focus for printing, viewing its source, or other forms of user interaction. The content slots may cause user devices 108 to request third-party content items in response to viewing first-party resource content from resources 104.

Resources 104 may generate a variety of events when a user action occurs. For example, in some implementations, resources 104 generate events when resource content is viewed, requested, presented, accessed, or in response to any other type of action or occurrence with respect to resource content (e.g., pageview events). Resources 104 may generate events associated with third party content items presented via resources 104 (e.g., impression events, click events, etc.). In some implementations, resources 104 generate conversion events in response to an action or behavior (e.g., by user devices 108) which satisfies conversion criteria (e.g., online purchases, click-through paths, etc.). Resources 104 may communicate user actions relating to the events to content server 112, dynamic sharding system 114, or a separate accounting server via network 102.

Still referring to FIG. 1, computer system 100 is shown to include content providers 106. Content providers 106 may include one or more electronic devices representing advertisers, publishers, business owners, or other entities capable of producing content to be provided with a resource 104 to a user device 108. In some implementations, content providers 106 produce content items (e.g., an ad creative) for presentation to user devices 108. In other implementations, content providers 106 may submit a request to have content items automatically generated. The content items may be stored in one or more data storage devices local to content providers 106, within content server 112, or in data storage devices 110.

In some implementations, the content items may be advertisements. The advertisements may be display advertisements such as image advertisements, animated advertisements, video advertisements, text-based advertisements, or any combination thereof. In other implementations, the content items may include other types of content which serve various non-advertising purposes. The content items may be displayed in a content slot of resources 104 and presented (e.g., alongside other resource content) to user devices 108.

Content providers 106 may submit campaign parameters to content server 112. The campaign parameters may be used to control the distribution of content items to user devices 108. The campaign parameters may include keywords associated with the content items, bids corresponding to the keywords, a content distribution budget, geographic limiters, adgroup information, or other criteria used by content server 112 to determine when a content item may be presented to user devices 108. Content server 112 may store the content items, keywords, and other data received from content providers 106 in a hierarchical data set. For example, content server 112 may store the data from content providers 106 in the following hierarchy:

Content Provider→Engine Account→Campaign→Adgroup→Keywords/Content Items

Content providers 106 may access content server 112 to monitor the performance of the content items distributed according to the established campaign parameters. For example, content providers 106 may access content server 112 to review one or more behavior metrics associated with a content item or group of content items. The behavior metrics may describe the interactions between user devices 108 with respect to a distributed content item or set of content items (e.g., number of impressions, number of clicks, number of conversions, an amount spent, etc.). The behavior metrics may be based on user actions logged and processed by a separate log file processing system and/or by content server 112.

Content providers 106 may submit a request to content server 112 (e.g., via a frontend management interface) to monitor the performance of various content items and/or keywords. For example, content providers 106 may submit a request for a list of highest-performing keywords within a particular ad campaign or request for a list of content items having a particular behavior metric (e.g., threshold number of impressions, clicks, etc.) for a particular engine account or overall for a particular content provider. These types of requests are generally considered "large" list requests because serving the request requires reading through a large dataset and/or processing a large amount of information. Content server 112 may interact with dynamic sharding system 114 to split the large list request into a plurality of smaller sharded requests for parallel processing. The activities of dynamic sharding system 114 are described in greater detail with reference to FIG. 2.

Still referring to FIG. 1, computer system 100 is shown to include user devices 108. User devices 108 may include any number and/or type of user-operable electronic devices. For example, user devices 108 may include desktop computers, laptop computers, smartphones, tablets, mobile communication devices, remote workstations, client terminals, entertainment consoles, or any other devices capable of interacting with the other components of computer system 100 (e.g., via a communications interface). For example, user devices 108 may be capable of receiving resource content from resources 104 and/or third-party content items from content providers 106 or content server 112. User devices 108 may include mobile devices or non-mobile devices.

In some implementations, user devices 108 include an application (e.g., a web browser, a resource renderer, etc.) for converting electronic content into a user-comprehensible format (e.g., visual, aural, graphical, etc.). User devices 108 may include a user interface element (e.g., an electronic display, a speaker, a keyboard, a mouse, a microphone, a printer, etc.) for presenting content to a user, receiving user input, or facilitating user interaction with electronic content (e.g., clicking on a content item, hovering over a content item, etc.). User devices 108 may function as a user agent for allowing a user to view HTML encoded content. User devices 108 may include a processor capable of processing embedded information (e.g., meta information embedded in hyperlinks, etc.) and executing embedded instructions. Embedded instructions may include computer-readable instructions (e.g., software code, object script, etc.) associated with a content slot within which a third-party content item is presented.

In some implementations, user devices 108 may be capable of detecting an interaction with a distributed content item. An interaction with a content item may include displaying the content item, hovering over the content item, clicking on the content item, viewing source information for the content item, or any other type of interaction between user devices 108 and a content item. Interaction with a content item does not require explicit action by a user with respect to a particular content item. In some implementations, an impression (e.g., displaying or presenting the content item) may qualify as an interaction. The criteria for defining which user actions (e.g., active or passive) qualify as an interaction may be determined on an individual basis (e.g., for each content item), by content providers 106, or by content server 112.

User devices 108 may generate a variety of user actions. For example, user devices 108 may generate a user action notifications in response to a detected interaction with a content item. A user action notification may include a plurality of attributes including a content identifier (e.g., a content ID or signature element), a device identifier, a referring URL identifier, a timestamp, or any other attributes describing the interaction. User devices 108 may generate user action notifications when particular actions are performed by a user device (e.g., resource views, online purchases, search queries submitted, etc.). The user action notifications generated by user devices 108 may be communicated to content server 112 and/or a separate accounting system via network 102.

For situations in which the systems discussed here collect personal information about users, or may make use of personal information, the users may be provided with an opportunity to control whether programs or features collect user information (e.g., information about a user's social network, social actions or activities, profession, a user's preferences, or a user's current location), or to control whether and/or how to receive content from the content server that may be more relevant to the user. In addition, certain data may be treated (e.g., by content server 112) in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, a user may have control over how information is collected (e.g., by an application, by user devices 108, etc.) and used by content server 112.

Still referring to FIG. 1, computer system 100 is shown to include data storage devices 110. Data storage devices 110 may be any type of memory device capable of storing profile data, content item data, accounting data, entity count data, or any other type of data used by content server 112 and/or dynamic sharding system 114. Data storage devices 110 may include any type of non-volatile memory, media, or memory devices. For example, data storage devices 110 may include semiconductor memory devices (e.g., EPROM, EEPROM, flash memory devices, etc.) magnetic disks (e.g., internal hard disks, removable disks, etc.), magneto-optical disks, and/or CD ROM and DVD-ROM disks. In some implementations, data storage devices 110 may be local to content server 112, dynamic sharding system 114, or content providers 106. In other implementations, data storage devices 110 may be remote data storage devices connected with content server 112 and/or dynamic sharding system 114 via network 102. In some implementations, data storage devices 110 may be part of a data storage server or system capable of receiving and responding to queries from content server 112. Data storage devices 110 may be distributed across multiple physical locations or consolidated into a single centralized data storage system.

Data storage devices 110 may store one or more hierarchical sets of keyword data and/or content item data submitted by content providers 106. In some implementations, each hierarchy is specific to a particular content provider and includes the content provider as the top level of the data hierarchy. The hierarchical data sets may include one or more levels below the content provider level such as an engine account level (e.g., listing the various accounts managed by the content provider for different content distribution networks), a campaign level (e.g., listing the various advertising campaigns managed by the content provider within each engine account), an adgroup level (e.g., listing various groups of content items and/or keywords within each campaign), and/or a keyword/content item level (e.g. listing the various keywords and/or content items within each adgroup). For example, a hierarchy for a content provider may have the following form:

Content Provider→Engine Account→Campaign→Adgroup→Keywords/Content Items

In some implementations, only the lowest level of the data hierarchy includes keywords and/or content items. The one or more intermediate levels between the content provider level and the keyword/content item level may classify the keywords and/or content items into branches of the data hierarchy. In other words, the one or more intermediate levels may function as hierarchical nodes.

In some implementations, data storage devices 110 store keywords and/or content items as data objects having attributes. The attributes may correspond to one or more levels of the data hierarchy within which the keywords and/or content items are organized. For example, data storage devices 110 may store a keyword with an "adgroup" attribute designating the particular adgroup to which the keyword belongs, a "campaign" attribute designating a particular campaign, an "engine account" attribute designating a particular engine account, and/or a "content provider" attribute designating a particular content provider. In some implementations, the hierarchy may be constructed or reconstructed with different attributes or with the attributes arranged differently than provided above. For example, a hierarchy can be constructed in reverse order (e.g., having keywords/content items at the top level of the hierarchy and content providers at the lowest level of the hierarchy) or in any other hierarchical order.

In some implementations, data storage devices 110 store hierarchical entity count data. Entity count data may include one or more entity count records. Each entity count record may correspond to a node of the data hierarchy. An entity count record for a particular node of the data hierarchy may summarize the number of items (e.g., child nodes, keywords, content items, etc.) at each lower level of the data hierarchy within the particular node. For example, suppose that a content provider has 10 engine accounts and that each engine account has 100 campaigns (i.e., 1,000 total campaigns). Each of the campaigns may have 100 adgroups (i.e., 100,000 total adgroups) and each adgroup may have 100 keywords (i.e., 10,000,000 total keywords) and 50 content items (i.e., 5,000,000 total content items).

An entity count record for the top level node (e.g., the content provider node) of a data hierarchy for this content provider may be represented as:

{ea_cnt: 10, cp_cnt: 1000, ag_cnt: 100000, kw_cnt: 100000000, ad_cnt: 5000000} where "ea_cnt: 10" indicates that there are ten engine accounts within the content provider node, "cp_cnt: 1000" indicates that there are one thousand campaigns within the content provider node, "ag_cnt: 100000" indicates that there are one hundred thousand adgroups within the content provider node, "kw_cnt: 10000000" indicates that there are ten million keywords within the content provider node, and "ad_cnt" indicates that there are five million content items within the content provider node.

An entity count record for one of the ten engine accounts (e.g., for a corresponding engine account node) may be represented as:

{cp_cnt: 100, ag_cnt: 10000, kw_cnt: 1000000, ad_cnt: 500000} where "cp_cnt: 100" indicates that there are one hundred campaigns within the corresponding engine count node, "ag_cnt: 10000" indicates that there are ten thousand adgroups within the corresponding engine account node, "kw_cnt: 1000000" indicates that there are one million keywords within the corresponding engine account node, and "ad_cnt: 500000" indicates that there are five hundred thousand content items within the corresponding engine account node.

In some implementations, data storage devices 110 may store an entity count record for each node of the hierarchical data set. For example, for the content provider described above, data storage devices 110 may store a single entity count record for the top level content provider node, ten entity count records corresponding to the ten engine account nodes, one thousand entity count records corresponding to the one thousand campaign nodes, and one hundred thousand entity count records corresponding to the one hundred thousand adgroup nodes. Data storage devices 110 may not store entity count records for individual keywords and/or content items because such entries are at the lowest level of the data hierarchy and have no child entities.

In some implementations, one or more entity count records may be stored in the active memory of dynamic sharding system 114. For example, dynamic sharding system 114 may periodically read and store in local memory the entity count records for one or more upper levels of the data hierarchy (e.g., content provider level, engine account level, campaign level, etc.). The upper levels of the data hierarchy can be represented with relatively few entity count records. For example, the top three levels of the data hierarchy provided above (i.e., the content provider level, the engine account level, and the campaign level) can be represented with only 1,011 entity count records (i.e., 1 content provider entity count record+10 engine account entity count records+1,000 campaign entity count records=1,011 total entity count records for the top three levels of the data hierarchy).

The entity count records provide an indication of the distribution of keywords and/or content items within the data hierarchy. For example, each of the entity count records for the campaign nodes of the data hierarchy provides an indication of the total number of keywords and/or content items within the corresponding campaign node. The entity count records can be updated to reflect changes in the hierarchical data (e.g., added or deleted keywords, moving a content item to a different adgroup or different campaign, etc.). In some implementations, the entity count records are generated (e.g., by dynamic sharding system 114 or by another system) using a map-reduce process and can be refreshed periodically to reflect the current distribution of the hierarchical data. Dynamic sharding system 114 uses the entity count records in determining how to split the hierarchical data into various shards, described in greater detail with reference to FIG. 2.

Still referring to FIG. 1, computer system 100 is shown to include a content server 112. Content server 112 may receive a request for a content item from resources 104 and/or user devices 108. In some implementations, the request for content items may include characteristics of one or more content slots in which the content items will be displayed. For example, such characteristics may include the URL of the resource 104 in which the content slot is located, a display size of the content slot, a position of the content slot, and/or media types that are available for presentation in the content slot. If the content slot is located on a search results page, keywords associated with the search query may also be provided to content server 112. The characteristics of the content slot and/or keywords associated with the content request may facilitate identification of content items that are relevant to resources 104 and/or to the search query.

Content server 112 may select an eligible content item in response to the request received from resources 104 or user devices 108. In some implementations, eligible content items may include content items having characteristics matching the characteristics of the content slots in which the content items are to be presented. For example, content server 112 may select a content item having a display size which fits in a destination content slot. In some implementations, content server 112 may resize a selected content item to fit a content slot or add additional visual content to the selected content item (e.g., padding, a border, etc.) based on the display size of the content item and the display size of the content slot.

In some implementations, content server 112 may select a content item determined to be relevant to a particular resource 104, user device 108, or search query. For example, content server 112 may select a content item by comparing the keywords associated with each content item (e.g., specified by content providers 106, additional keywords extracted from the content item, etc.) with the keywords associated with the resource 104 or user device 108 requesting the content item. A topic or type of content included in resources 104 may be used to establish keywords for resources 104.

In some implementations, content server 112 may select a content item by comparing the keywords associated with each content item with information (e.g., profile data, user preferences, etc.) associated with a particular user device 108 requesting the content item. In some implementations, content server 112 may select a content item that does not match established user preferences if an insufficient number of preferred content items are available. In some implementations, content server 112 may select a content item based on an established click-through-rate, a predicted click-through-rate, a bid price associated with each content item, or other relevant selection criteria.

Content server 112 may provide a front end management interface through which content providers 106 can interact with content server 112. For example, content server 112 may provide a management interface through which content providers 106 can monitor the performance of various content items and/or keywords, add, delete, or modify content items and/or keywords, adjust campaign parameters (e.g., bids, geographic limiters, etc.), or otherwise control the information associated with the various content items and keywords managed by content providers 106.

Content server 112 may be configured to receive requests from content providers 106. For example, content providers 106 may submit a request for a list of highest-performing keywords within a particular ad campaign or request for a list of content items having a particular behavior metric (e.g., threshold number of impressions, clicks, etc.). Content server 112 may interact with dynamic sharding system 114 to split the request into a plurality of smaller sharded requests which can be processed in parallel for reduced latency.

Still referring to FIG. 1, computer system 100 is shown to include a dynamic sharding system 114. Dynamic sharding system 114 may be configured to dynamically and adaptively split a database into multiple shards (i.e., smaller chunks of the database) to facilitate parallel processing thereof. Dynamic sharding system 114 uses the hierarchical structure of the database to determine how the database should be split. For example, dynamic sharding system 114 may use the entity count records (e.g., stored in data storage devices 110 or in local memory) to identify a level of the hierarchy (e.g., the engine account level, the campaign level, the adgroup level, etc.) on which to split the database. In some implementations, dynamic sharding system 114 uses the entity count records to determine whether to recursively split on a node (e.g., splitting a node across multiple shards if the node is too large) and/or whether to group multiple nodes (e.g., combining data within several nodes into a single shard if the nodes are too small).

Dynamic sharding system 114 may read a minimal amount of data in determining how to shard the database. Using the entity count records, dynamic sharding system 114 can determine a sharding scheme for the hierarchical data by reading only the data at the hierarchical level at which the database is split (and possibly data at a subset of the lower levels if the split is recursive). The data read by dynamic sharding system 114 are much smaller than the overall data to read for the entire request (e.g., the entire set of keywords and/or content items and their associated attributes) and can be read without introducing significant latency into the request serving process.

Dynamic sharding system 114 may be configured to split a request (e.g., a keyword request, a search request, a request for a report, etc.) into a plurality of smaller (i.e., "sharded") requests. Dynamic sharding system 114 may receive such requests from content server 112 and/or from content providers 106 via a frontend management interface or another API configured to receive requests for information and relay the requests to dynamic sharding system 114. Dynamic sharding system 114 may use the entity count records to identify a hierarchical level at which the database can be sharded in order to serve the request. For example, if the request is a keyword request requiring that the entire set of keywords in a particular database be read, dynamic sharding system 114 may shard the database into a plurality of shards that contain approximately equal numbers of keywords (e.g., to optimize the efficiency of parallel processing).

In some implementations, dynamic sharding system 114 determines a number of shards into which the database should be split by selecting a number of shards that minimizes processing latency. For example, if N data processing sites are available to process the sharded requests, dynamic sharding system 114 may generate N shards (or a multiple of N shards) in order to minimize processing latency.

In some implementations, dynamic sharding system 114 shards the database at a particular level of the hierarchal data set. For example, if the campaign level includes one thousand campaigns (e.g., as indicated by the top level entity count record), dynamic sharding system 114 may generate one thousand shards (e.g., one shard for each campaign). Dynamic sharding system 114 may read only the data for the level at which the hierarchy is split and not any of the data at lower levels of the hierarchy to split the original large request into a plurality of smaller sharded requests. If the shards are distributed across different servers, they can be processed in parallel.

Figure 2:
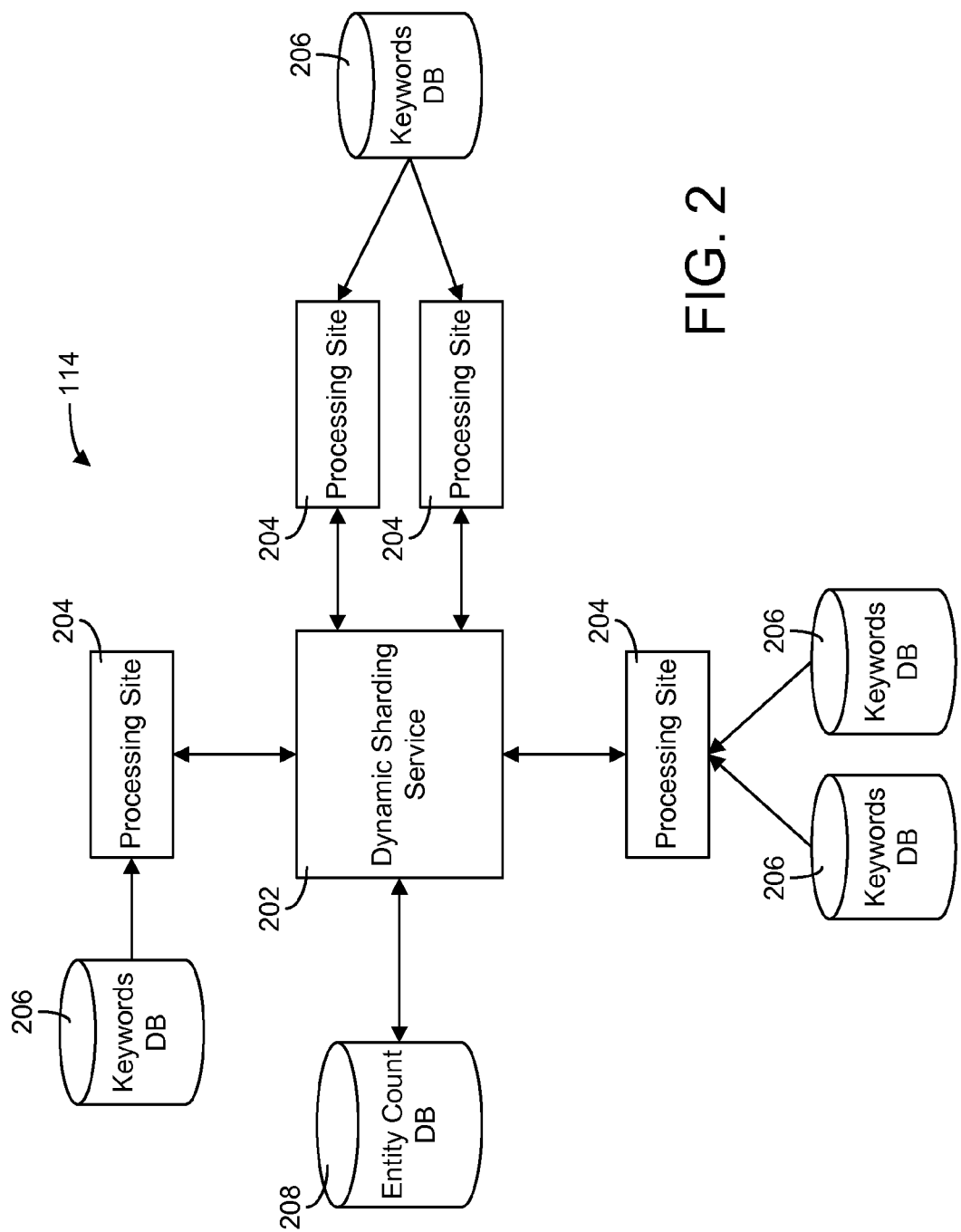
FIG. 2 is a block diagram illustrating the dynamic sharding system of FIG. 1 in greater detail, showing a dynamic sharding service, an entity counts database, a keywords database, and a plurality of processing sites, according to a described implementation.

Referring now to FIG. 2, the activities of dynamic sharding system 114 are shown in greater detail, according to a described implementation. Dynamic sharding system 114 is shown to include a dynamic sharding service 202 and a plurality of processing sites 204. In some implementations, dynamic sharding service 202 is a component of processing sites 204. For example, processing sites 204 may run dynamic sharding service 202 to split a request received at one of processing sites 204 into a plurality of sharded requests.

In some implementations, dynamic sharding service 202 is a network service that can be run by any of processing sites 204. For example, any of processing sites 204 may receive a request (e.g., a "large list" request from content providers 106). The processing site 204 at which the request is received can call and run dynamic sharding service 202 to split the large request into multiple sharded requests. The sharded requests can then be processed in parallel by a single processing site 204 or distributed across multiple processing sites 204.

Dynamic sharding service 202 may be configured to manage database and/or request sharding. For example, dynamic sharding service 202 may be configured to split a large database into a plurality of smaller database shards and/or split a request for data from a large database into a plurality of smaller sharded requests. The shards or sharded requests may then be assigned to a processing site (e.g., one or more processing sites 204) for data processing.

Processing sites 204 may process the shards and/or sharded requests in parallel, thereby expediting data processing and reducing processing latency. Processing sites 204 may represent data centers, server locations, or other locations at which data processing can be performed. Processing sites 204 may include one or more machines (e.g., multiple machines in a data center) that can be used to process shards in parallel.

Still referring to FIG. 2, dynamic sharding system 114 is shown to include keywords databases 206. Keywords databases 206 may be an implementation of data storage devices 110 or a separate database system. Keywords databases 206 may be configured to store keyword data, content item data, or other data submitted and/or selected by content providers 106. The data in keywords databases 206 may be replicated and stored in multiple keywords databases 206 (e.g., redundantly) and/or distributed across multiple physical or logical keywords databases 206 (e.g., stored partially in each of keywords databases 206).

As shown in FIG. 2, one processing site 204 may be connected with a single keywords database 206, multiple keywords databases 206 may be connected with a single processing site 204, and/or multiple processing sites 204 may be connected with a single keywords database 206. It should be understood that in various implementations, any number of processing sites may be included in dynamic sharding system 114, any number of keywords databases may be associated with a processing site, and multiple processing sites may be associated with a single keywords database. In some implementations, keywords databases 206 can be combined with processing sites 204. For example, a single processing site 204 may include several data processing machines and one or more keywords databases 206 (e.g., within a data center).

In some implementations, keywords databases 206 store data according to a hierarchical organization scheme. In some implementations, each hierarchy is specific to a particular content provider and includes the content provider as the top level of the data hierarchy. For example, keywords databases 206 may store keyword data and/or content item data according to the following data hierarchy:

Content Provider→Engine Account→Campaign→Adgroup→Keywords/Content Items

In some implementations, only the lowest level of the data hierarchy includes keywords and/or content items. The one or more intermediate levels between the content provider level and the keyword/content item level may classify the keywords and/or content items into branches of the data hierarchy. In other words, the one or more intermediate levels may function as hierarchical nodes for the keyword data and/or content item data.

The data in keywords databases 206 may be dynamically updated (e.g., by content providers 106) via a frontend management interface. For example, content providers 106 may add or remove keywords and/or content items from a particular data set and change the distribution of the data within a data set (e.g., moving a keyword from one adgroup to another, moving an adgroup from one campaign to another, adding a keyword association to a content item, etc.).

Keywords databases 206 may be configured to store multiple versions of the data contained therein. For example, each time a change is made to a hierarchical data set, keywords databases 206 may store a new set of data reflecting the change. Previous versions of the data may be stored alongside the most recent version of the data. Each version of the data may be associated with a timestamp and stored along with the associated timestamp (e.g., as metadata). The timestamp may reflect, for example, a time at which the data was written to keywords databases 206 or a time at which the corresponding version of the data was created. Processing sites 204 may use the timestamp to ensure that each of processing sites 204 is reading the same version of the data when processing a request at multiple different processing sites 204 in order to ensure consistent results.

In some implementations, keywords databases 206 store statistics or other data metrics associated with the keywords and/or content items. For example, the data metrics may include a number of impressions or clicks associated with a particular content item, bids information associated with a keyword, or other data relevant to the performance of the various keywords and/or content items. The data metrics may be stored with the keywords and content items (e.g., as metadata) or separately from the keywords and content items.

Still referring to FIG. 2, dynamic sharding system 114 is shown to include an entity count database 208. Entity count database 208 may be configured to store hierarchical entity count records associated with the hierarchical data in keywords databases 206. Each entity count record may correspond to a node of the data hierarchy. An entity count record for a particular node of the data hierarchy may summarize the number of items (e.g., child nodes, keywords, content items, etc.) at each lower level of the data hierarchy within the particular node. For example, an entity count record for the top level node (e.g., the content provider node) of a data hierarchy may be represented as:

{ea_cnt: 10, cp_cnt: 1000, ag_cnt: 100000, kw_cnt: 100000000, ad_cnt: 5000000} where "ea_cnt: 10" indicates that there are ten engine accounts within the content provider node, "cp_cnt: 1000" indicates that there are one thousand campaigns within the content provider node, "ag_cnt: 100000" indicates that there are one hundred thousand adgroups within the content provider node, "kw_cnt: 10000000" indicates that there are ten million keywords within the content provider node, and "ad_cnt" indicates that there are five million content items within the content provider node.

An entity count record for one of the ten engine accounts (e.g., for a corresponding engine account node) may be represented as:

{cp_cnt: 100, ag_cnt: 10000, kw_cnt: 1000000, ad_cnt: 500000} where "cp_cnt: 100" indicates that there are one hundred campaigns within the corresponding engine count node, "ag_cnt: 10000" indicates that there are ten thousand adgroups within the corresponding engine account node, "kw_cnt: 1000000" indicates that there are one million keywords within the corresponding engine account node, and "ad_cnt: 500000" indicates that there are five hundred thousand content items within the corresponding engine account node. It should be noted that the numbers provided in this example are merely exemplary and may be different for various data hierarchies.

The entity count records provide an indication of the distribution of keywords and/or content items within the data hierarchy. For example, each of the entity count records for the campaign nodes of the data hierarchy provides an indication of the total number of keywords and/or content items within the corresponding campaign node. Dynamic sharding service 202 may use the entity count records stored in entity count database 208 to determine a sharding scheme for the hierarchical data stored in keywords database 206. Dynamic sharding service 202 is described in greater detail with reference to FIG. 3.

In some implementations, entity count database 208 stores an entity count record for each node of the hierarchical data set. In other implementations, entity count database 208 stores entity count records for only some of the nodes of the hierarchical data set (e.g., nodes in the top two levels, nodes in the top three levels, nodes in the top four levels, etc.). The upper levels of the data hierarchy can be represented with relatively few entity count records. For example, the top three levels of the data hierarchy provided above (i.e., the content provider level, the engine account level, and the campaign level) can be represented with only 1,011 entity count records (i.e., 1 content provider entity count record+10 engine account entity count records+1,000 campaign entity count records=1,011 total entity count records).

In some implementations, the entity count records are generated by dynamic sharding service 202 (e.g., using a map-reduce process) and stored in entity count database 208. Dynamic sharding service 202 may update the entity count records stored in entity count database 208 to account for changes in the hierarchical distribution (e.g., as a result of changes made by content providers 106). For example, dynamic sharding service 202 may periodically index keywords databases 206 (e.g., using processing sites 204 or a separate indexing service) to determine a current distribution of the keywords and/or content items within the hierarchical data set. While FIG. 2 illustrates entity count database 208 coupled to each log database 206 through state server 202, entity count database 208 may be configured to communicate directly to each log database 206 or through any number of paths.

In some implementations, entity count database 208 is part of the active local memory of dynamic sharding service 202 and/or processing sites 204 (e.g., RAM, solid state memory, etc.). Storing the entity count records in active memory allows the entity counts to be read with minimized input/output cost, thereby minimizing processing latency. Because the top several levels of the data hierarchy can be represented with relatively few entity count records, entity count database 208 may not consume a prohibitively large amount of memory.

Figure 3:
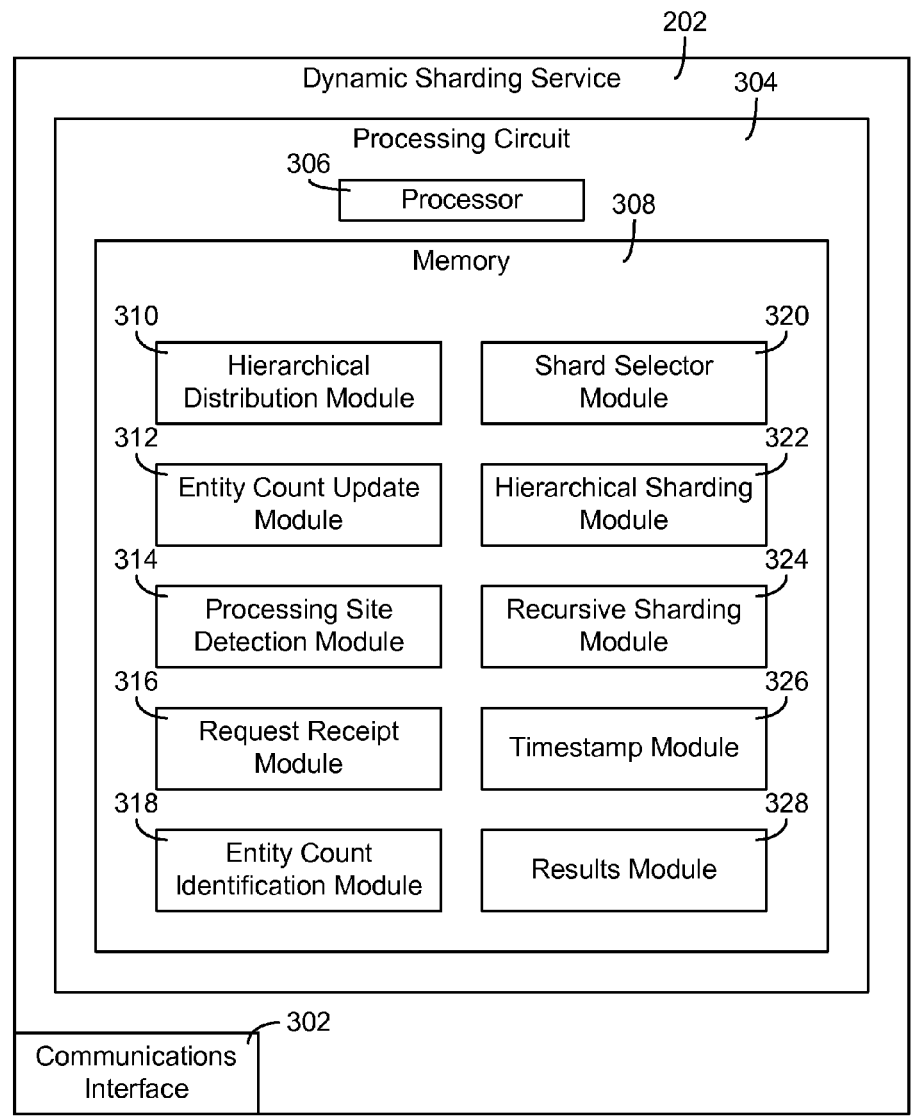
FIG. 3 is a block diagram illustrating the dynamic sharding service of FIG. 2 in greater detail, according to a described implementation.

Referring now to FIG. 3, a block diagram illustrating dynamic sharding service 202 in greater detail is shown, according to a described implementation. In some implementations, dynamic sharding service 202 is a component of processing sites 204. For example, processing sites 204 may run dynamic sharding service 202 to split a request received at one of processing sites 204 into a plurality of sharded requests. In some implementations, dynamic sharding service 202 is a network service that can be run by any of processing sites 204. Any of processing sites 204 may receive a request (e.g., a "large list" request from content providers 106). The processing site 204 at which the request is received can call and run dynamic sharding service 202 to split the large request into multiple sharded requests. The sharded requests can then be processed in parallel by a single processing site 204 or distributed across multiple processing sites 204.

Dynamic sharding service 202 is shown to include a communications interface 302 and a processing circuit 304. Communications interface 302 may include wired or wireless interfaces (e.g., jacks, antennas, transmitters, receivers, transceivers, wire terminals, Ethernet ports, WiFi transceivers, etc.) for conducting data communications with local or remote devices or systems. For example, communications interface 302 may allow dynamic sharding service 202 to communicate with processing sites 204 (e.g., for implementations in which dynamic sharding service 202 and processing sites 204 are separate), keywords database 206, entity counts database 208, and other components of computer system 100 (e.g., network 102, resources 104, content providers 106, user devices 108, data storage devices 110, content server 112, etc.).

Processing circuit 304 is shown to include a processor 306 and memory 308. Processor 306 may be implemented as a general purpose processor, an application specific integrated circuit (ASIC), one or more field programmable gate arrays (FPGAs), a CPU, a GPU, a group of processing components, or other suitable electronic processing components.

Memory 308 may include one or more devices (e.g., RAM, ROM, flash memory, hard disk storage, etc.) for storing data and/or computer code for completing and/or facilitating the various processes, layers, and modules described in the present disclosure. Memory 308 may include volatile memory or non-volatile memory. Memory 308 may include database components, object code components, script components, or any other type of information structure for supporting the various activities and information structures described in the present disclosure. In some implementations, memory 308 is communicably connected to processor 306 via processing circuit 304 and includes computer code (e.g., data modules stored in memory 308) for executing one or more processes described herein. In brief overview, memory 308 is shown to include a hierarchical distribution module 310, an entity count update module 312, a processing site detection module 314, a request receipt module 316, an entity count identification module 318, a shard selector module 320, a hierarchical sharding module 322, a recursive sharding module 324, a timestamp module 326, and a results module 328.

Still referring to FIG. 3, memory 308 is shown to include a hierarchical distribution module 310. Hierarchical distribution module 310 may be configured to identify a hierarchical distribution of the keywords data and/or the content item data stored in keywords database 206. Identifying a hierarchical distribution may include determining a number of nodes at each level of the data hierarchy and identifying a number of keywords and/or content items within each node. For example, one content provider with 10 million keywords could have 1,000 campaigns (i.e., an average of 10,000 keywords per campaign) whereas another content provider with 10 million keywords could have only 100 campaigns (i.e., an average of 1,000 keywords per campaign).

Moreover, the distribution of keywords within each campaign, engine account, and/or adgroup may not be uniform or consistent. For example, a content provider may have one campaign that has 8,000 keywords and another campaign that has only 80 keywords. Hierarchical distribution module 310 may use the information from keywords database 206 to identify a relative distribution of the set of keywords and/or content items across the various nodes of the data hierarchy. In some implementations, hierarchical distribution module 310 counts a number of items within each node of the hierarchy. In some implementations, hierarchical distribution module 310 determines a data size associated with each item and/or each node of the data hierarchy. The distribution of the set of keywords and/or content items may be expressed as a number of items associated with each node, a data size of each node, or both a number of items and a data size of each node of the hierarchical data set.

In some implementations, hierarchical distribution module 310 periodically reads data from keywords database 206 to identify a hierarchical distribution of the data stored therein. In other implementations, hierarchical distribution module 310 interacts with a separate indexing service that periodically reads data from keywords database 206 and provides a result to hierarchical distribution module 310. Hierarchical distribution module 310 may identify the hierarchical distribution of the keywords data and/or content item data at regular intervals (i.e., periodically), upon the occurrence of an event (e.g., an update from a content provider, a system restart, an input from a user or a separate system or device, etc.), or otherwise monitor the data within keywords database 206. By observing the hierarchical distribution of the keywords data and/or content item data at various times, hierarchical distribution module 310 can account for changes in the hierarchical distribution resulting from updates received from content providers 106.

In some implementations, hierarchical distribution module 310 constructs a data hierarchy from non-hierarchical data. For example, hierarchical distribution module 310 may read attributes of the keywords and/or content items stored within keywords database 206 and construct a hierarchy based on the attributes. In various implementations, attributes may include, for example, an "adgroup" attribute identifying a particular adgroup, a "campaign" attribute identifying a particular campaign, an "engine account" attribute identifying a particular engine account, a "content provider" attribute identifying a particular content provider, and/or any other attribute associated with the keywords data and content item data in keywords database 206. Hierarchical distribution module 310 may select one attribute to be a top level attribute of the data hierarchy, a second attribute to be a next lower level of the data hierarchy, and so on until the hierarchy is complete. The mapping of various attributes to different levels of the data hierarchy may be indicated by a user, received from a separate system or process, or determined automatically by hierarchical distribution module 310.

Still referring to FIG. 3, memory 308 is shown to include an entity count update module 312. Entity count update module 312 may be configured to update the entity count records in entity count database 208. Entity count update module 312 may use the information from hierarchical distribution module 310 to generate entity count records. For example, entity count update module 312 may use the number of nodes at each level of the data hierarchy and the number of keywords and/or content items within each node to generate entity count records for the data hierarchy.

In some implementations, entity count update module 312 generates an entity count record for each node of the data hierarchy. An entity count record for a particular node of the data hierarchy may summarize the number of items (e.g., child nodes, keywords, content items, etc.) at each lower level of the data hierarchy within the particular node. For example, suppose that a content provider has 10 engine accounts and that each engine account has 100 campaigns (i.e., 1,000 total campaigns). Each of the campaigns may have 100 adgroups (i.e., 100,000 total adgroups) and each adgroup may have 100 keywords (i.e., 10,000,000 total keywords) and 50 content items (i.e., 5,000,000 total content items).

Entity count update module 312 may create the following entity count record for the top level node (e.g., the content provider node) of this data hierarchy:

{ea_cnt: 10, cp_cnt: 1000, ag_cnt: 100000, kw_cnt: 100000000, ad_cnt: 5000000} where "ea_cnt: 10" indicates that there are ten engine accounts within the content provider node, "cp_cnt: 1000" indicates that there are one thousand campaigns within the content provider node, "ag_cnt: 100000" indicates that there are one hundred thousand adgroups within the content provider node, "kw_cnt: 10000000" indicates that there are ten million keywords within the content provider node, and "ad_cnt" indicates that there are five million content items within the content provider node.

Entity count update module 312 may create entity count records for other nodes of the data hierarchy as well. For example, entity count update module 312 may create the following entity count record for one of the ten engine account nodes of the data hierarchy provided above:

{cp_cnt: 100, ag_cnt: 10000, kw_cnt: 1000000, ad_cnt: 500000} where "cp_cnt: 100" indicates that there are one hundred campaigns within the corresponding engine count node, "ag_cnt: 10000" indicates that there are ten thousand adgroups within the corresponding engine account node, "kw_cnt: 1000000" indicates that there are one million keywords within the corresponding engine account node, and "ad_cnt: 500000" indicates that there are five hundred thousand content items within the corresponding engine account node.

Continuing with the example data hierarchy provided above, entity count update module 312 may create the following entity count record for one of the 1,000 campaign nodes:

{ag_cnt: 100, kw_cnt: 10000, ad_cnt: 5000} and the following entity count record for one of the 100,000 adgroup nodes:

{kw_cnt: 100, ad_cnt: 50}

In some implementations, entity count update module 312 creates entity count records for only a predetermined number of levels of the data hierarchy. For example, entity count update module 312 may create entity count records for the top level node of the data hierarchy and one or more levels immediately below the top level of the data hierarchy (e.g., the top two levels, the top three levels, the top four levels, etc.). Notably, the cardinality of the hierarchy (i.e., the number of items at each level) may not grow prohibitively large until the lowest level (e.g., the keyword/content item level) or one or two levels above the lowest level. Entity count update module 312 can conserve significant processing and memory resources by limiting the entity count records to the top level and one or more levels immediately below the top level.

Entity count update module 312 may store the entity count records in entity count database 208. In some implementations, entity count database 208 is part of the active memory of dynamic sharding system 114 and/or dynamic sharding service 202 (e.g., memory 308). By storing the entity count records in active memory, entity count update module 312 can provide minimized resource consumption for reading the entity counts (e.g., minimized I/O cost, minimized hard disc access, minimized network traffic, minimized bandwidth, minimized processor usage, etc.).

Entity count update module 312 may update the entity count records in entity count database 208 at regular intervals (i.e., periodically), upon the occurrence of an event (e.g., an update from a content provider, a system restart, an input from a user or a separate system or device, etc.), or otherwise to ensure that the entity count records reflect the current distribution of data within the hierarchical set. By periodically updating the entity count records, entity count update module 312 can account for changes in the hierarchical distribution resulting from keywords and/or content items being added, deleted, modified, moved within the hierarchy, reassigned to different branches of the data hierarchy, or otherwise adjusted by content providers 106.

Still referring to FIG. 3, memory 308 is shown to include a processing site detection module 314. Processing site detection module 314 may be configured to identify characteristics of the processing sites 204 to which data shards can be assigned for processing. For example, processing site detection module 314 may determine a number of available processing sites 204, an average processing time associated with each of processing sites 204, a rate at which each of processing sites 204 typically process data, a number of machines at each of processing sites 204, and/or other metrics relevant to the data processing capabilities of processing sites 204. The information gathered by processing site detection module 314 may be used to determine a number of shards into which to split a database, a data size of each shard, and/or the processing sites 204 to which the shards can be assigned to minimize processing time.

In some implementations, processing site detection module 314 is configured to determine whether a portion of the keywords data and/or content item data is stored locally to one or more of processing sites 204. For example, as shown in FIG. 2, some portions of keywords database 206 may be local to some of processing sites 204, whereas other portions of keywords database 206 may be local to other processing sites 204. Processing site detection module 314 may determine which portions of the keywords data and/or content item data are local to each of processing sites 204. The information gathered by processing site detection module 314 may be used by hierarchical sharding module 322 to assign data to various shards (e.g., grouping data stored in the same location) and/or to assign the shards to processing sites 204 (e.g., assigning a shard to a local processing site).

Still referring to FIG. 3, memory 308 is shown to include a request receipt module 316. Request receipt module 316 may be configured to receive a request for information stored in keywords database 206. The request may be received from content providers 106 (e.g., via a frontend management interface), from content server 112, from user devices 108, or from any other entity, system, or process. For example, content providers 106 may use a frontend management interface to monitor the performance of various content items and/or keywords. Content providers 106 may submit a request for a list of highest-performing keywords within a particular ad campaign, a request for a list of content items having a particular behavior metric (e.g., threshold number of impressions, clicks, etc.), a request for a list of keywords and their associated keyword bids, or any other request for data stored in keywords database 206. In various implementations, the request may be received at any of processing sites 204 at which dynamic sharding service 202 can be implemented or at a separate server (e.g., content server 112, etc.) that forwards the request to dynamic sharding service 202 and/or one of processing sites 204.

Request receipt module 316 may be configured to receive and identify large list requests. Request receipt module 316 may identify a large list request as a request that requires reading through a large dataset (e.g., a data set having a size exceeding a threshold value) and/or processing a large amount of information (e.g., a number of keywords, content items, or data size exceeding a threshold value) in order to serve the request. If a request is identified as a large list request, request receipt module 316 may determine whether the request can be sharded into a plurality of smaller requests. For example, request receipt module 316 may use the entity count records created by entity count update module 312 to determine whether a hierarchical organization scheme applies to the requested data to (e.g., to facilitate sharding). Request receipt module 316 may also use the information gathered by processing site detection module 314 to determine whether multiple processing sites 204 can be used to process the request.

Still referring to FIG. 3, memory 308 is shown to include an entity count identification module 318. Entity count identification module 318 may be configured to identify one or more entity count records relating to a request (e.g., a request received by request receipt module 316). In various implementations, entity count identification module 318 may identify a particular content provider associated with the request, a particular set of data from which information is requested, an account from which the request is received, and/or other parameters of the request.

Entity count identification module 318 may use the request parameters to determine whether any entity count records corresponding to requested data exist in entity count database 208. For example, if the request includes an indication of a particular content provider, entity count identification module 318 may search the entity count records in entity count database 208 for the particular content provider. If one or more entity count records are identified, entity count identification module 318 may flag or retrieve the identified entity count records for use in sharding the request into a plurality of smaller requests.

Still referring to FIG. 3, memory 308 is shown to include a shard selector module 320. Shard selector module 320 may be configured to determine a number of shards into which to split a hierarchical data set and/or a request for data from the hierarchical data set. Shard selector module 320 may receive the identified entity count records for the data set from entity count database 208. Shard selector module 320 may use the entity count records to determine a total number of keywords in the data set, a total number of content items in the data set, a total data size of the data set, and/or other attributes of the data set.

In some implementations, shard selector module 320 determines an appropriate number of shards into which to split the data set such that each of the shards has a target number of keywords and/or content items. For example, if the data set includes 10 million keywords and the target number of keywords per shard is 10,000 keywords, shard selector module 320 may determine that approximately 1,000 shards are appropriate. In some implementations, shard selector module 320 determines an appropriate number of shards into which to split the data set such that each of the shards has a target data size. For example, if the data set has a total data size of approximately 10 GB and the target data size per shard is 100 MB, shard selector module 320 may determine that approximately 102 shards are appropriate. The target numbers of keywords per shard, content items per shard, and/or data size per shard can be specified by a user, received from another system or process, or automatically determined by shard selector module 320 (e.g., based on the processing capabilities of processing sites 204).

In some implementations, shard selector module 320 uses the processing site information gathered by processing site detection module 314 to determine the number and capabilities of processing sites 204. In some implementations, shard selector module 320 determines a number of shards that minimizes processing latency, based on the number and capabilities of processing sites 204. For example, if N data processing sites 204 having roughly equivalent processing speeds are available to process the sharded requests, shard selector module 320 may determine that N shards (or a multiple of N shards) would maximize the potential for parallel processing, thereby minimizing processing latency.

In some implementations, shard selector module 320 determines an appropriate number of shards into which to split the data set such that the total number of shards is consistent across multiple data sets. For example, shard selector module 320 attempt to create a target number of shards (e.g., 100 shards, 1,000 shards, 64 shards, etc.) for each data set regardless of the number of keywords and/or content items in the data set. In such an implementation, the number of keywords and/or content items per shard may vary based on the total number of keywords and/or content items in the data set. The target number of shards can be specified by a user, received from another system or process, or automatically determined by shard selector module 320 (e.g., based on the number and processing capabilities of processing sites 204).

Still referring to FIG. 3, memory 308 is shown to include a hierarchical sharding module 322. Hierarchical sharding module 322 may be configured to split a hierarchical data set into a plurality of shards based on the hierarchical structure and/or distribution of the data set. In some implementations, hierarchical sharding module 322 is configured to split a request for information from a hierarchical data set into a plurality of sharded requests. Each of the plurality of sharded requests may correspond to one of the plurality of shards and can be served by processing the corresponding shard.

Hierarchical sharding module 322 may receive the entity count records for the data set identified by entity count identification module 318. Hierarchical sharding module 322 may use the entity count records to determine a distribution of keywords within the data set, a distribution of content items within the data set, the data size distribution of the data set, and/or other attributes of the data set. For example, for each entity count record identified by entity count identification module 318, hierarchical sharding module 322 may determine the number of keywords, the number of content items, and/or the data size of the corresponding node.

In some implementations, hierarchical sharding module 322 splits the data set into a plurality of shards at a selected level of the data hierarchy. Hierarchical sharding module 322 may select a level of the data hierarchy based on the number of nodes at the various levels of the data hierarchy (e.g., as indicated by the entity count records). In some implementations, hierarchical sharding module 322 selects the level of the data hierarchy having a number of nodes closest to the appropriate number of shards determined by shard selector module 320. For example, if shard selector module 320 determines that 1,000 shards are appropriate using one or more of the techniques previously described (e.g., the target number of keywords and/or content items per shard, the target data size per shard, etc.), hierarchical sharding module 322 may select the level of the data hierarchy having the number of nodes closest to 1,000.

Suppose, for example, that the engine account level of the data hierarchy has 10 nodes and the campaign level of the data hierarchy has 1,008 nodes. Hierarchical sharding module 322 may select the campaign level over the engine account level since the difference between the number of nodes at the campaign level and the appropriate number of nodes (i.e., |1008−1000|=8) is less than the difference between the number of nodes at the engine account level and the appropriate number of nodes (i.e., |10−1000|=990).

Hierarchical sharding module 322 may split the database into a plurality of shards based on the number of nodes at the selected hierarchical level. In some implementations, hierarchical sharding module 322 splits the database at the selected hierarchical level by assigning each node of the selected hierarchical level to a different shard. For example, if the selected hierarchical level has 1,008 nodes, hierarchical sharding module 322 may create 1,008 shards (i.e., one shard per node).

In some implementations, hierarchical sharding module 322 uses a key range of the hierarchical data set to split the hierarchical data into multiple shards. For example, each node of the hierarchical data set may be stored (e.g., in keywords database 206) with a key range identifying the hierarchical data within the node. Hierarchical sharding module 322 may identify the key range associated with each node and generate a plurality of shards using the identified key ranges. For example, the data assigned to each shard may be defined by a start key and an end key. Hierarchical sharding module 322 may generate shards by splitting a large key range spanning the entire hierarchal data set into a plurality of smaller key ranges (e.g., one key range for each shard).

In some implementations, hierarchical sharding module 322 may split a node of the selected hierarchical level into multiple shards (e.g., two shards per node, three shards per node, etc.) and/or combine multiple nodes of the selected hierarchical level into a single shard (e.g., two nodes per shard, three nodes per shard, etc.). Hierarchical sharding module 322 may split and/or combine nodes such that each shard has a similar number of keywords, content items, and/or data size. Splitting a node may include splitting the key range corresponding to the node into two or more smaller key ranges. For example, the key range 1084-3226 may be split into two or more smaller key ranges (e.g., 1084-2112 and 2113-3226). Combining nodes may include combining two or more smaller key ranges into a single larger key range. For example, the key ranges 988-1042 and 1043-1087 may be combined into the key range 988-1087.

Hierarchical sharding module 322 may assign each of the plurality of shards to one of processing sites 204 for processing. In some implementations, hierarchical sharding module 322 assigns shards to processing sites 204 that are local to the data included in the shard. In some implementations, hierarchical sharding module 322 groups data stored in the same portion of keywords database 206 when creating the plurality of shards. By including data stored in the same location in the same shard, the entirety of a shard can be processed locally by one of processing sites 204 without transferring or copying data between keywords databases 206.

Still referring to FIG. 3, memory 308 is shown to include a recursive sharding module 324. Recursive sharding module 324 may be configured to recursively split a shard into a plurality of sub-shards using the hierarchical structure of the shard. In some implementations, recursive sharding module 324 is configured to split a sharded request for information stored in the shard into a plurality of sub-sharded requests. Each of the plurality of sub-sharded requests may correspond to one of the sub-shards and can be served by processing the corresponding sub-shard.

In some implementations, recursive sharding module 324 determines whether one or more of the shards produced by hierarchical sharding module 322 is too large (e.g., too many keywords, too many content items, too large of a data size, etc.). Recursive sharding module 324 may determine that a shard is too large if the number of keywords, content items, and/or data size associated with the shard exceeds a threshold value. The threshold value may be a static threshold (e.g., a fixed number of keywords, a fixed number of content items, a fixed data size), a dynamic threshold (e.g., based on a total number of keywords, content items, and/or data size of the data set), or based on an average of the other shards produced by hierarchical sharding module 322.

Recursive sharding module 324 may split a shard into a plurality of sub-shards using the same or similar process used by hierarchical sharding module 322 to split a data set into a plurality of shards. For example, recursive sharding module 324 may receive entity count records for the shard. The entity count records may include an entity count record for the highest level node for the shard (e.g., a campaign node) and one or more entity count records for lower level nodes within the shard's hierarchy (e.g., adgroup nodes). Recursive sharding module 324 may use the entity count records to determine a distribution of keywords within the shard, a distribution of content items within the shard, the data size distribution of the shard, and/or other attributes of the shard.

In some implementations, recursive sharding module 324 determines a minimum number of sub-shards into which the shard can be split to satisfy the threshold criteria. For example, if the number of keywords in the shard is between the maximum permissible number of keywords and twice the maximum permissible number of keywords, recursive sharding module 324 may determine that splitting the shard into two sub-shards would satisfy the maximum keyword criterion. If the data size of the shard is between twice the maximum permissible data size and three times the permissible data size, recursive sharding module 324 may determine that splitting the shard into three sub-shards would satisfy the maximum data size criterion. Recursive sharding module 324 may select the minimum number of sub-shards that satisfies all of the threshold criteria.

In some implementations, recursive sharding module 324 splits the shard into a plurality of sub-shards at a selected level of the data hierarchy. Recursive sharding module 324 may select a level of the data hierarchy based on the number of nodes at the various levels of the shard's hierarchy (e.g., as indicated by the entity count records). In some implementations, recursive sharding module 324 selects the level of the data hierarchy having a number of nodes closest to the minimum number of sub-shards. Recursive sharding module 324 may split the shard at the selected level of the data hierarchy by assigning nodes at the selected level to various sub-shards. In some implementations, recursive sharding module 324 assigns nodes to various sub-shards such that each sub-shard has a similar number of keywords, content items, and/or data size.

Recursive sharding module 324 may be a component of dynamic sharding service 202 and/or of processing sites 204. For implementations in which recursive sharding module 324 is component of processing sites 204, a shard may be split into a plurality of sub-shards regardless of the number of keywords, content items, or data size of the shard. In other words, processing sites 204 may split a shard into a plurality of sub-shards even if the shard satisfies all of the threshold criteria. The sub-shards produced by recursive sharding module 324 can be processed in parallel in multiple threads of a single machine, across multiple machines within a processing site 204, and/or split across multiple processing sites 204 to further increase throughput. Parallel processing a single shard assigned to one of processing sites 204 is described in greater detail with reference to FIG. 4.

Still referring to FIG. 3, memory 308 is shown to include a timestamp module 326. Timestamp module 326 may be configured to attach a timestamp (e.g., as metadata) to the shards produced by hierarchical sharding module 322 and/or the sub-shards produced by recursive sharding module 324. In some implementations, timestamp module 326 records a time that the original request is received by request receipt module 316 and generates the timestamp based on the original time of receipt. Processing sites 204 may use the timestamp associated with each shard to determine a version of the hierarchical data to read and process. In some implementations, processing sites 204 identify a most recent version of the hierarchical data prior to the timestamp attached to the shard. The timestamp may ensure that all processing sites 204 are reading the same version of the data set to ensure consistent results when processing the multiple shards separately.

Still referring to FIG. 3, memory 308 is shown to include and a results module 328. Results module 328 may be configured to receive and store the results of processing each of the plurality of shards and sub-shards. For example, as each shard and sub-shard is processed by processing sites 204, the results may be recoded in a buffer of rows (e.g., in temporary memory) for each shard/sub-shard. Results module 328 may merge the rows into a single database (e.g., a data table, a data set, etc.) and store the data in memory 308.

In some implementations, results module 328 uses the processed results to generate a response to the original data request (e.g., from content providers 106). Results module 328 may send the results (e.g., as a data stream) to content server 112 or directly to content providers 106. The results may be visualized by a client application and/or front end management interface to provide a response to the original request.

Figure 4:
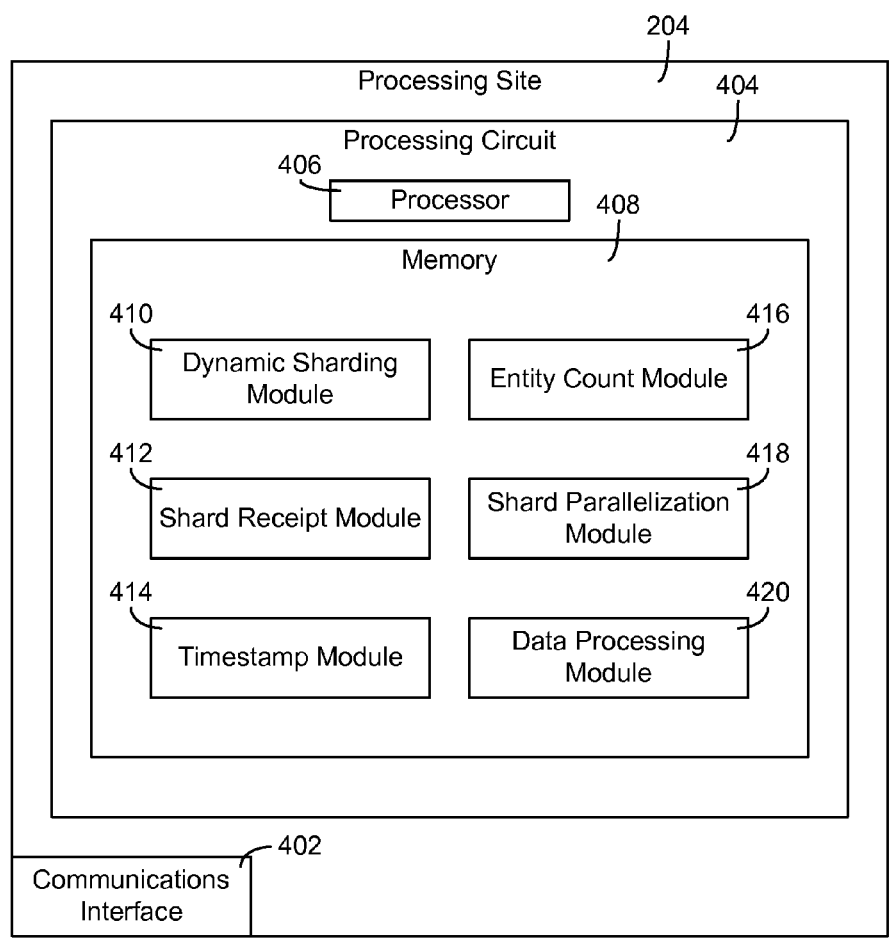
FIG. 4 is a block diagram illustrating one of the processing sites of FIG. 2 in greater detail, according to a described implementation.

Referring now to FIG. 4, a block diagram of one of processing sites 204 is shown, according to a described implementation. Processing site 204 may be a data center, a server location, or systems or devices at which data processing can be performed. Processing site 204 may include one or more machines (e.g., multiple machines in a data center) that can be used to process shards in parallel.

Processing site 204 may be configured to receive and process a hierarchical database shard or sharded request. Processing site 204 may identify a version of the hierarchical data associated with the shard or sharded request and retrieve a consistent view of the hierarchical data from keywords database 206. Processing site 204 may split the shard into a plurality of sub-shards using the hierarchical structure of the data associated with the shard. The sub-shards may be processed in parallel (e.g., by multiple machines, by multiple threads of a single machine, etc.), thereby expediting data processing and reducing processing latency.

Processing site 204 is shown to include a communications interface 402 and a processing circuit 404. Communications interface 402 may include wired or wireless interfaces (e.g., jacks, antennas, transmitters, receivers, transceivers, wire terminals, Ethernet ports, WiFi transceivers, etc.) for conducting data communications with local or remote devices or systems. For example, communications interface 402 may allow processing site 204 to communicate with dynamic sharding service 202 (e.g., for implementations in which dynamic sharding service 202 and processing sites 204 are separate), keywords database 206, entity counts database 208, and other components of computer system 100 (e.g., network 102, resources 104, content providers 106, user devices 108, data storage devices 110, content server 112, etc.).

Processing circuit 404 is shown to include a processor 406 and memory 408. Processor 406 may be implemented as a general purpose processor, an application specific integrated circuit (ASIC), one or more field programmable gate arrays (FPGAs), a CPU, a GPU, a group of processing components, or other suitable electronic processing components.

Memory 408 may include one or more devices (e.g., RAM, ROM, flash memory, hard disk storage, etc.) for storing data and/or computer code for completing and/or facilitating the various processes, layers, and modules described in the present disclosure. Memory 408 may include volatile memory or non-volatile memory. Memory 408 may include database components, object code components, script components, or any other type of information structure for supporting the various activities and information structures described in the present disclosure. In some implementations, memory 408 is communicably connected to processor 406 via processing circuit 404 and includes computer code (e.g., data modules stored in memory 408) for executing one or more processes described herein. In brief overview, memory 408 is shown to include a dynamic sharding module 410, a shard receipt module 412, a timestamp module 414, an entity count module 416, a shard parallelization module 418, and a data processing module 420.

Still referring to FIG. 4, memory 408 is shown to include a dynamic sharding module 410. Dynamic sharding module 410 may be configured to perform the activities of dynamic sharding service 202, as described with reference to FIG. 3. For example, dynamic sharding module 410 may be configured to receive a large request from content providers 106 and split the request into a plurality of sharded requests. The sharded requests can then be processed in parallel by a single processing site 204 or distributed across multiple processing sites 204. In some implementations, dynamic sharding service 202 is a network service that can be run by any of processing sites 204. Dynamic sharding module 410 may be configured to call and run dynamic sharding service 202 to split the large request into multiple sharded requests. Each of the shards may be assigned to a processing site (e.g., one or more processing sites 204) for data processing.

Still referring to FIG. 4, memory 408 is shown to include a shard receipt module 412. Shard receipt module 412 may be configured to receive hierarchical shard and/or sharded request. In some implementations, the shard may be received from a local dynamic sharding module 410. In other implementations, the shard may be received from a separate processing site.

Shard receipt module 412 may be configured to identify a hierarchical structure associated with the data shard. For example, the shard may correspond to a particular node of a larger hierarchical data set that was previously split (e.g., by dynamic sharding module 410, by dynamic sharding service 202, etc.) to create a plurality of database shards. Shard receipt module 412 may treat each database shard as a separate data hierarchy. In other words, shard receipt module 412 may consider the non-top level node of the original data hierarchy as the top level node for the shard.

Still referring to FIG. 4, memory 408 is shown to include a timestamp module 414. Timestamp module 414 may be configured to read a timestamp attached to each shard received by shard receipt module 412. Timestamp module 414 may use the timestamp to determine a version of the hierarchical data to read and process. For example, the hierarchical data in keywords database 206 may stored in multiple different versions. Each time a change is made to a hierarchical data set, keywords databases 206 may store a new set of data reflecting the change. Previous versions of the data may be stored alongside the most recent version of the data. Each version of the data may be associated with a timestamp and stored along with the associated timestamp (e.g., as metadata). The timestamp may reflect, for example, a time at which the data was written to keywords databases 206 or a time at which the corresponding version of the data was created.

Timestamp module 414 may use the timestamp to ensure that each of processing sites 204 to which a shard is assigned is reading the same version of the data when processing a request. By assigning the same timestamp to each shard produced from an original large request, the shards can be processed in parallel while ensuring consistent results. In some implementations, timestamp module 414 identifies a most recent version of the hierarchical data prior to the timestamp attached to the shard as the version of the hierarchical data to read and process.

Still referring to FIG. 4, memory 408 is shown to include an entity count module 416. Entity count module 416 may be substantially the same or similar to entity count identification module 318 described with reference to FIG. 3. For example, entity count module 416 may be configured to identify one or more entity count records in entity count database 208 corresponding to the shard or sharded request received by shard receipt module 412. In various implementations, entity count module 416 may identify a particular content provider associated with the sharded request, a particular set of data from which information is requested, an account from which the sharded request is received, and/or other parameters of the sharded request.

Entity count module 416 may use the request parameters to determine whether any entity count records corresponding to requested data exist in entity count database 208. For example, if the request includes an indication of a particular content provider, entity count module 416 may search the entity count records in entity count database 208 for the particular content provider. If one or more entity count records are identified, entity count module 416 may flag or retrieve the identified entity count records. In some implementations, entity count module retrieves an entity count record for a top level node of the shard and one or more lower level nodes.

Still referring to FIG. 4, memory 408 is shown to include a shard parallelization module 418. Shard parallelization module 418 may be configured to split a shard into a plurality of sub-shards using a hierarchical structure of the shard. In some implementations, shard parallelization module 418 is substantially similar or the same as hierarchical sharding module 322 described with reference to FIG. 3.

Shard parallelization module 418 may receive the entity count records for the shard identified by entity count module 416. Shard parallelization module 418 may use the entity count records to determine a distribution of keywords within the shard, a distribution of content items within the shard, the data size distribution of the shard, and/or other attributes of the shard. For example, for each entity count record identified by entity count module 416, shard parallelization module 418 may determine the number of keywords, the number of content items, and/or the data size of the corresponding node.

In some implementations, shard parallelization module 418 splits the shard into a plurality of sub-shards at a selected level of the shard's data hierarchy. Shard parallelization module 418 may select a level of the data hierarchy based on the number of nodes at the various levels of the shard's data hierarchy (e.g., as indicated by the entity count records). In various implementations, shard parallelization module 418 selects the level of the data hierarchy having a number of nodes closest to a target number of nodes or a level that would result in each sub-shard having a data size closest to a target data size and/or a number of data entries closest to a target number of data entries.

Shard parallelization module 418 may split the shard into a plurality of sub-shards based on the number of nodes at the selected hierarchical level. In some implementations, shard parallelization module 418 splits the shard at the selected hierarchical level by assigning each node of the selected hierarchical level to a different sub-shard.

In some implementations, shard parallelization module 418 uses a key range of the hierarchical data set to split the shard into multiple sub-shards. For example, each node of the shard's hierarchy may be stored (e.g., in keywords database 206) with a key range identifying the hierarchical data within the node. Shard parallelization module 418 may identify the key range associated with each node and generate a plurality of sub-shards using the identified key ranges. For example, the data assigned to each sub-shard may be defined by a start key and an end key. Shard parallelization module 418 may generate shards by splitting a large key range spanning the entire hierarchy of the shard into a plurality of smaller key ranges (e.g., one key range for each sub-shard).

Shard parallelization module 418 may distribute the plurality of sub-shards to be processed in parallel. In various implementations, shard parallelization module 418 assigns the sub-shards to different processing sites 204, different processing devices (e.g., different physical devices, different logical devices, etc.) within a single processing site 204, and/or to different processing threads or services within a single processing device. The number of processing devices, threads, and machines that can be used for concurrent processing may be adjusted (e.g., as a tunable parameter used by shard parallelization module 418).

In some implementations, shard parallelization module 418 assigns sub-shards to processing sites, devices, and/or threads that are local to the data included in the sub-shard. In some implementations, shard parallelization module 418 groups data stored in the same portion of keywords database 206 when creating the plurality of sub-shards. By including data stored in the same location in the same sub-shard, the entirety of a sub-shard can be processed locally by one of processing sites 204 without transferring or copying data between keywords databases 206.

In some implementations, shard parallelization module 418 assigns the same sub-shard to multiple processing sites, devices, and/or threads. Processing the same sub-shard multiple times may provide a mechanism for validating the processing results. The validation mechanism can also provide a comparison of processing performance across multiple processing sites 204 and can check the correctness of the parallel processing logic implemented at each processing site 204. In some implementations, performance comparison testing may also be performed by dynamic sharding module 410. For example, dynamic sharding module 410 may send an original request or sharded request to multiple processing sites (e.g., a processing site that does not split and parallel process the request and a processing site that creates multiple shards and/or sub-shards to process the request). By sending the same hierarchical data request to multiple processing sites, an effectiveness of the dynamic sharding process can be measured.

Still referring to FIG. 4, memory 408 is shown to include a data processing module 420. Data processing module 420 may be configured to receive a shard or sub-shard (e.g., from dynamic sharding module 410, from shard parallelization module 418, etc.) and process the hierarchical data associated therewith. In some implementations, data processing module 420 translates a shard into a processing scope. The processing scope may be defined by the key range associated with the shard and may identify a particular range of data in keywords database 206 for processing.

Data processing module 420 may read the hierarchical data corresponding to the shard or sub-shard from keywords database 206 and process the hierarchical data to generate processing results. Data processing module 206 may store the processing results in a data store (e.g., data storage devices 110, keywords database 206, etc.) based on the key range associated with the shard or sub-shard from which the processing results are produced. Each of a plurality of data processing modules 420 on multiple devices and/or processing sites 204 may store processing results to a single database based on the key ranges of the respective shards and sub-shards. By using key ranges to store the processing results, no additional sorting or data aggregation is required.

The dynamic sharding and parallel processing systems of the present disclosure may significantly reduce processing and reporting latency. In an online environment in which results are expected in real time, reducing processing and reporting latency results in a more pleasant user experience. Unlike conventional parallel processing techniques (e.g., map-reduce, etc.), the systems and methods described herein can split and process hierarchical data sets. Additionally, the systems and methods of the present disclosure can adapt to changes in the hierarchical data set to ensure balanced and efficient parallel processing into the future.

Figure 5:
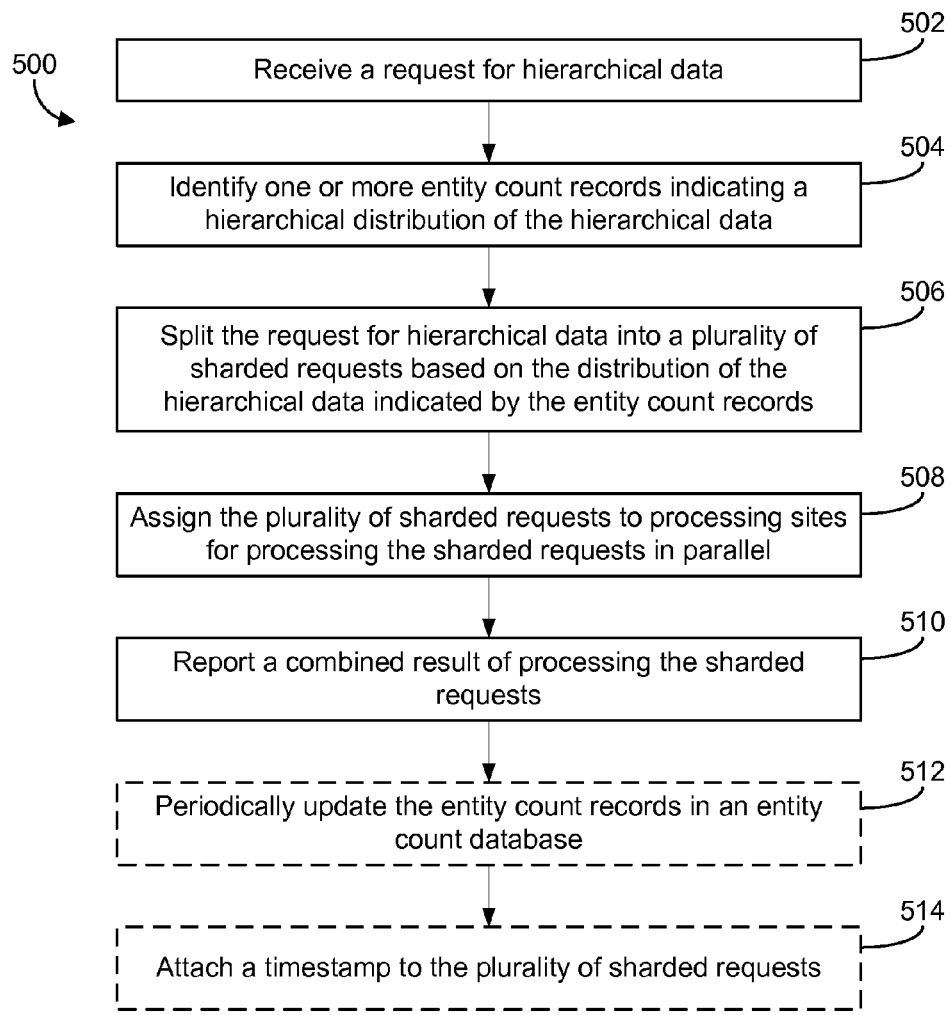
FIG. 5 is a flowchart of a process for dynamically sharding a request for hierarchical data, according to a described implementation.

Referring now to FIG. 5, a flowchart of a process 500 for serving a request for hierarchical data is shown, according to a described implementation. Process 500 may be performed by dynamic sharding system 114 and the components thereof (e.g., dynamic sharding service 202, processing sites 204, etc.) as described with reference to FIGS. 1-3.

Process 500 is shown to include receiving a request for hierarchical data (step 502). The hierarchical data may be stored in one or more databases (e.g., keywords database 206). In some implementations, the request includes an indication of a particular data hierarchy. The data hierarchy may represent an account associated with a content provider and may include a set of keywords and/or content items associated with the content provider. The request for hierarchical data may be received by one of processing sites 204.

The request may be received from content providers 106 (e.g., via a frontend management interface), from content server 112, from user devices 108, or from any other entity, system, or process. For example, content providers 106 may use a frontend management interface to monitor the performance of various content items and/or keywords. Content providers 106 may submit a request for a list of highest-performing keywords within a particular ad campaign, a request for a list of content items having a particular behavior metric (e.g., threshold number of impressions, clicks, etc.), a request for a list of keywords and their associated keyword bids, or any other request for data stored in keywords database 206.

In some implementations, step 502 includes identifying large list requests. A large list request may be identified as a request that requires reading through a large dataset (e.g., a data set having a size exceeding a threshold value) and/or processing a large amount of information (e.g., a number of keywords, content items, or data size exceeding a threshold value) in order to serve the request. If a request is identified as a large list request, step 502 may include determining whether the request can be sharded into a plurality of smaller requests.

Still referring to FIG. 5, process 500 is shown to include identifying one or more entity count records indicating a hierarchical distribution of the hierarchical data (step 504). The entity count records may correspond to a particular data hierarchy and may indicate a distribution of the hierarchical data within the particular data hierarchy. In some implementations, each of the entity count records corresponds to a node of the data hierarchy and includes an indication of a number of data entries at one or more lower levels the data hierarchy within the corresponding node. For example, an entity count record for a particular node of the data hierarchy may summarize the number of items (e.g., child nodes, keywords, content items, etc.) at each lower level of the data hierarchy within the particular node. In some implementations, the entity count records include a top level entity count record including an indication of a total number of data entries at a lowest level of the data hierarchy and an indication of a number of nodes at each lower level of the data hierarchy other than the lowest level.

In various implementations, step 504 includes identifying a particular content provider associated with the request, identifying a particular set of data from which information is requested, identifying an account from which the request is received, and/or identifying other parameters relating to the request. Step 504 may include using the request parameters to determine whether any entity count records corresponding to requested data exist in entity count database 208. For example, if the request includes an indication of a particular content provider, step 504 may include searching the entity count records in entity count database 208 for the particular content provider. If one or more entity count records are identified, step 504 may include flagging or retrieving the identified entity count records for use in sharding the request into a plurality of smaller requests.

Still referring to FIG. 5, process 500 is shown to include splitting the request for hierarchical data into a plurality of sharded requests based on the distribution of the hierarchical data indicated by the entity count records (step 506). Step 506 may be performed by shard selector module 320 and/or hierarchical sharding module 322 as described with reference to FIG. 3.

In some implementations, step 506 includes determining a level of the data hierarchy at which to split the request. Determining a level of the data hierarchy at which to split the request may include determining a target number of shards into which to split the hierarchical data and using the entity count records to identify a level of the data hierarchy having a number of nodes closest to the target number of shards.

In various implementations, determining a number of shards into which to split the hierarchical data includes determining a number of shards such that such that each of the shards has a target number of keywords, a target number of content items, and/or a target data size. In some implementations, step 506 includes determining a number of shards that minimizes processing latency (e.g., based on the number and capabilities of processing sites 204). In some implementations, step 506 includes determining a number of shards such that the total number of shards is consistent across multiple data sets (e.g., a target number of shards).

In some implementations, determining a level of the data hierarchy at which to split the request includes using the entity count records to identify a first set of nodes at a first level of the data hierarchy and a first distribution of the hierarchical data between the first set of nodes. The entity count records may be further used to identify a second set of nodes at a second level of the data hierarchy and a second distribution of the hierarchical data between the second set of nodes. The level at which to split the request may be determined by selecting either the first level of the data hierarchy or the second level of the data hierarchy based on which of the first distribution and the second distribution is most evenly distributed.

In some implementations, step 506 includes using the entity count records to identify a number of nodes at the determined level of the data hierarchy. The data hierarchy may be split into a plurality of shards based on the number of nodes at the selected hierarchical level. In some implementations, step 506 includes splitting the database at the selected hierarchical level by assigning each node of the selected hierarchical level to a different shard.

In some implementations, step 506 includes splitting a node of the selected hierarchical level into multiple shards (e.g., two shards per node, three shards per node, etc.) and/or combining multiple nodes of the selected hierarchical level into a single shard (e.g., two nodes per shard, three nodes per shard, etc.). Nodes may be split and/or combined such that each shard has a similar number of keywords, content items, and/or data size.

Still referring to FIG. 5, process 500 is shown to include assigning the plurality of sharded requests to processing sites for processing the sharded requests in parallel (step 508). In some implementations, step 508 includes assigning shards to processing sites 204 that are local to the data included in the shard. In some implementations, step 508 includes grouping data stored in the same portion of keywords database 206 when assigning the plurality of shards. By assigning a shard to a local processing site the shard can be without transferring or copying data between keywords databases 206.

Still referring to FIG. 5, process 500 is shown to include reporting a combined result of processing the sharded requests (step 510). Step 510 may be performed by results module 328 as described with reference to FIG. 3. As each shard is processed by processing sites 204, the results may be recoded in a buffer of rows (e.g., in temporary memory) for each shard. Step 510 may include merging the rows into a single database (e.g., a data table, a data set, etc.) and storing the combined data in memory.

In some implementations, step 510 includes using the processed results to generate a response to the original data request (e.g., from content providers 106). The results may be sent as a data stream to content server 112 or directly to content providers 106. The results may be visualized by a client application and/or front end management interface to provide a response to the original request.

In some implementations, process 500 includes periodically updating the entity count records in an entity count database (step 512). Step 512 may include monitoring or periodically checking the data within keywords database 206 to determine a number of nodes at each level of the data hierarchy and the number of keywords and/or content items within each node. In some implementations, step 512 includes generating entity count records for the data hierarchy.

In some implementations, step 512 includes generating entity count records for only a predetermined number of levels of the data hierarchy. For example, step 512 may include creating entity count records for the top level node of the data hierarchy and one or more levels immediately below the top level of the data hierarchy (e.g., the top two levels, the top three levels, the top four levels, etc.).

Step 512 may include storing the entity count records in entity count database 208. In some implementations, entity count database 208 is part of the active memory of dynamic sharding system 114 and/or dynamic sharding service 202 (e.g., memory 308). By storing the entity count records in active memory, process 500 can provide minimized resource consumption for reading the entity counts (e.g., minimized hard disc access, minimized network traffic, minimized bandwidth, minimized processor usage, minimized input/output cost, etc.).

In various implementations, step 512 may include updating the entity count records in entity count database 208 at regular intervals (i.e., periodically), upon the occurrence of an event (e.g., an update from a content provider, a system restart, an input from a user or a separate system or device, etc.), or otherwise to ensure that the entity count records reflect the current distribution of data within the hierarchical set. By periodically updating the entity count records, process 500 can account for changes in the hierarchical distribution resulting from keywords and/or content items being added, deleted, modified, moved within the hierarchy, reassigned to different branches of the data hierarchy, or otherwise adjusted by content providers 106.

In some implementations, process 500 includes attaching a timestamp to the plurality of sharded requests (step 514). Step 514 may include attaching a timestamp (e.g., as metadata) to the shards and/or sharded requests generated in step 506. In some implementations, step 514 includes recording a time that the original request is received by request receipt module 316 and generating the timestamp based on the original time of receipt. The timestamp indicates a time at which to read the data in keywords database 206 when the shards are processed by processing sites 204. The timestamp may ensure that all processing sites 204 are reading the same version of the data set to ensure consistent results when processing the multiple shards separately.

It should be understood that in application of process 500, various steps may be re-arranged or omitted. For example, steps 512-514 may not be performed in some implementations or step 512 may be performed periodically independent from other steps of process 500. As another example, step 514 may be performed prior to or concurrent with assigning the plurality of sharded requests to the processing sites (step 508).

Figure 6:
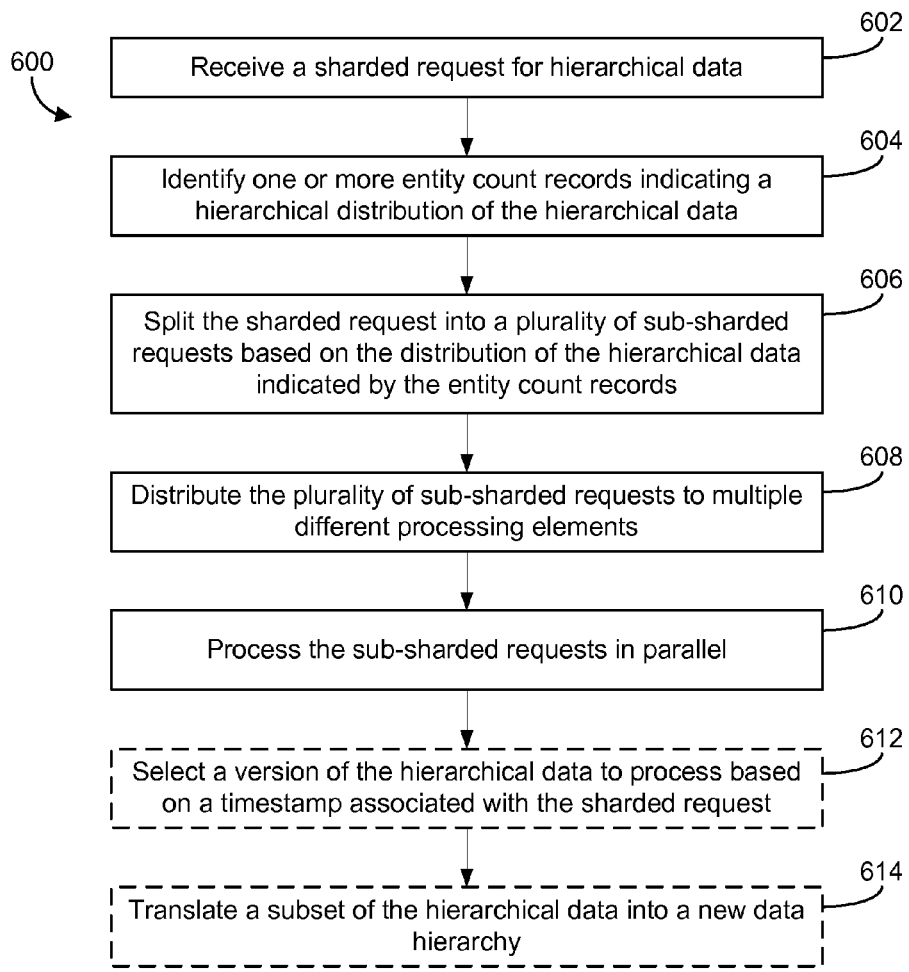
FIG. 6 is a flowchart of a process for processing a sharded request for hierarchical data, according to a described implementation.

Referring now to FIG. 6, a flowchart of a process 600 for processing sharded hierarchical data in parallel is shown, according to a described implementation. Process 600 may be performed by one or more of processing sites 204 as described with reference to FIGS. 1-3. For example, a processing site 204 may perform process 600 upon completion of process 500 (i.e., upon receiving a sharded request for hierarchical data). Process 600 may be performed to further split the sharded request into a plurality of sub-sharded requests and to distribute the sub-sharded requests to multiple processing elements for efficient parallel processing.

Process 600 is shown to include receiving a sharded request for hierarchical data (step 602). The sharded request may be produced by dynamic sharding service 202 by performing process 500. The hierarchical data may be stored in one or more databases (e.g., keywords database 206). In some implementations, the sharded request includes an indication of a particular data hierarchy. The data hierarchy may represent an account associated with a content provider and may include a set of keywords and/or content items associated with the content provider. The sharded request for hierarchical data may be received by one of processing sites 204.

In some implementations, step 602 includes identifying large list requests. A large list request may be identified as a request that requires reading through a large dataset (e.g., a data set having a size exceeding a threshold value) and/or processing a large amount of information (e.g., a number of keywords, content items, or data size exceeding a threshold value) in order to serve the request. If a sharded request is identified as a large list request, step 602 may include determining whether the sharded request can be further split into a plurality of smaller requests. In some implementations, the sharded request is further split into a plurality of smaller requests regardless of whether the sharded request is identified as a large list request. Splitting a sharded request into multiple sub-sharded requests and processing the various sub-shards in parallel can expedite processing for any size request.

Still referring to FIG. 6, process 600 is shown to include identifying one or more entity count records indicating a hierarchical distribution of the hierarchical data (step 604). The entity count records may correspond to a particular data hierarchy and may indicate a distribution of the hierarchical data within the particular data hierarchy. In some implementations, each of the entity count records corresponds to a node of the data hierarchy and includes an indication of a number of data entries at one or more lower levels the data hierarchy within the corresponding node. For example, an entity count record for a particular node of the data hierarchy may summarize the number of items (e.g., child nodes, keywords, content items, etc.) at each lower level of the data hierarchy within the particular node. In some implementations, the entity count records include a top level entity count record including an indication of a total number of data entries at a lowest level of the data hierarchy and an indication of a number of nodes at each lower level of the data hierarchy other than the lowest level.

In various implementations, step 604 includes identifying a particular content provider associated with the sharded request, identifying a particular set of data from which information is requested, identifying an account associated with the sharded request, and/or identifying other parameters relating to the sharded request. Step 604 may include using the request parameters to determine whether any entity count records corresponding to requested data exist in entity count database 208. For example, if the sharded request includes an indication of a particular content provider, step 604 may include searching the entity count records in entity count database 208 for the particular content provider. If one or more entity count records are identified, step 604 may include flagging or retrieving the identified entity count records for use in splitting the sharded request into a plurality of smaller sub-sharded requests.

Still referring to FIG. 6, process 600 is shown to include splitting the sharded request into a plurality of sub-sharded requests based on the distribution of the hierarchical data indicated by the entity count records (step 606). Step 606 may be performed by shard parallelization module 418 as previously described with reference to FIG. 4. In some implementations, the hierarchical data represents the original (e.g., complete) non-sharded data. Step 606 may include identifying a portion of the hierarchical data corresponding to the sharded request.

In some implementations, step 606 includes determining a level of the data hierarchy at which to split the request. Determining a level of the data hierarchy at which to split the sharded request may include determining a target number of sub-shards into which to split the hierarchical data and using the entity count records to identify a level of the data hierarchy having a number of nodes closest to the target number of sub-shards.

In various implementations, determining a number of sub-shards into which to split the hierarchical data includes determining a number of sub-shards such that such that each of the sub-shards has a target number of keywords, a target number of content items, and/or a target data size. In some implementations, step 606 includes determining a number of sub-shards that minimizes processing latency (e.g., based on the number and capabilities of various parallel processing elements used to process the sub-sharded requests). In some implementations, step 606 includes determining a number of sub-shards such that the total number of sub-shards is consistent across multiple data sets (e.g., a target number of sub-shards).

In some implementations, determining a level of the data hierarchy at which to split the sharded request includes using the entity count records to identify a first set of nodes at a first level of the data hierarchy and a first distribution of the hierarchical data between the first set of nodes. The entity count records may be further used to identify a second set of nodes at a second level of the data hierarchy and a second distribution of the hierarchical data between the second set of nodes. The level at which to split the sharded request may be determined by selecting either the first level of the data hierarchy or the second level of the data hierarchy based on which of the first distribution and the second distribution is most evenly distributed.

In some implementations, step 606 includes using the entity count records to identify a number of nodes at the determined level of the data hierarchy. The data hierarchy may be split into a plurality of sub-shards based on the number of nodes at the selected hierarchical level. In some implementations, step 606 includes splitting the database at the selected hierarchical level by assigning each node of the selected hierarchical level to a different shard.

In some implementations, step 606 includes splitting a node of the selected hierarchical level into multiple sub-shards (e.g., two sub-shards per node, three sub-shards per node, etc.) and/or combining multiple nodes of the selected hierarchical level into a single sub-shard (e.g., two nodes per sub-shard, three nodes per sub-shard, etc.). Nodes may be split and/or combined such that each sub-shard has a similar number of keywords, content items, and/or data size.

In some implementations, step 606 includes using a key range of the hierarchical data set to split the shard into multiple sub-shards. For example, each node of the shard's hierarchy may be stored (e.g., in keywords database 206) with a key range identifying the hierarchical data within the node. Step 606 may include identifying the key range associated with each node and generate a plurality of sub-shards using the identified key ranges. For example, the data assigned to each sub-shard may be defined by a start key and an end key. Step 606 may include generating sub-shards by splitting a large key range spanning the entire hierarchy of the shard into a plurality of smaller key ranges (e.g., one key range for each sub-shard).

Still referring to FIG. 6, process 600 is shown to include distributing the plurality of sub-sharded requests to multiple different processing elements (step 608). Processing elements may include, for example, multiple processing sites 204, multiple processing machines within a single processing site 204, multiple threads within a single processing machine, or other types of data processing systems or devices. In some implementations, step 608 includes assigning sub-shards to processing sites 204 that are local to the data included in the sub-shard. In some implementations, step 608 includes grouping data stored in the same portion of keywords database 206 when assigning the plurality of sub-shards. By assigning a sub-shard to a local processing site the sub-shard can be without transferring or copying data between keywords databases 206.

Still referring to FIG. 6, process 600 is shown to include processing the sub-sharded requests in parallel (step 610). Step 610 may be performed by data processing module 420 as described with reference to FIG. 4. In some implementations, step 610 includes translating a sub-shard into a processing scope. The processing scope may be defined by the key range associated with the sub-shard and may identify a particular range of data in keywords database 206 for processing.

Step 610 may include reading the hierarchical data corresponding to the sub-shard from keywords database 206 and processing the hierarchical data to generate processing results. Step 610 may include storing the processing results in a data store (e.g., data storage devices 110, keywords database 206, etc.) based on the key range associated with the shard or sub-shard from which the processing results are produced. Each of a plurality of processing elements to which the various sub-shards are distributed may store processing results to a single database based on the key ranges of the respective shards and sub-shards. By using key ranges to store the processing results, no additional sorting or data aggregation is required.

Still referring to FIG. 6, process 600 is shown to include selecting a version of the hierarchical data to process based on a timestamp associated with the sharded request (step 612). In some implementations, step 612 is performed by timestamp module 414 as described with reference to FIG. 4. Step 612 may include reading a timestamp attached to the shard or sharded request received in step 402. Step 612 may include using the timestamp to determine a version of the hierarchical data to read and process. For example, the hierarchical data in keywords database 206 may stored in multiple different versions. Each time a change is made to a hierarchical data set, keywords databases 206 may store a new set of data reflecting the change. Previous versions of the data may be stored alongside the most recent version of the data. Each version of the data may be associated with a timestamp and stored along with the associated timestamp (e.g., as metadata). The timestamp may reflect, for example, a time at which the data was written to keywords databases 206 or a time at which the corresponding version of the data was created.

Step 612 may include using the timestamp to ensure that each of processing sites 204 to which a shard is assigned is reading the same version of the data when processing a request. By assigning the same timestamp to each shard produced from an original large request, the shards can be processed in parallel while ensuring consistent results. In some implementations, step 612 includes identifying a most recent version of the hierarchical data prior to the timestamp attached to the shard as the version of the hierarchical data to read and process.

Still referring to FIG. 6, process 600 is shown to include translating a subset of the hierarchical data into a new data hierarchy (step 614). In some implementations, the hierarchical data represents the original (e.g., complete) non-sharded data. Step 614 may include identifying a portion of the hierarchical data corresponding to the sharded request and creating a new data hierarchy out of the portion of the hierarchical data corresponding to the sharded request. For example, step 614 may include determining a highest level node of the subset of the data hierarchy corresponding to the sharded request. The highest level node in the subset of the data hierarchy may be a child node of the original data hierarchy within which the subset is located. Step 614 may further include using the highest level node of the subset of the data hierarchy as a root node of the new data hierarchy to translate the subset of the data hierarchy into a new data hierarchy.

It should be understood that in application of process 600, various steps may be re-arranged or omitted. For example, steps 608, and 612-614 may not be performed in some implementations. As another example, steps 612 and 614 may be performed prior to or concurrent with step 604.

The dynamic sharding and parallel processing systems of the present disclosure may significantly reduce processing and reporting latency. In an online environment in which results are expected in real time, reducing processing and reporting latency results in a more pleasant user experience. Unlike conventional parallel processing techniques (e.g., map-reduce, etc.), the systems and methods described herein can split and process hierarchical data sets. Additionally, the systems and methods of the present disclosure can adapt to changes in the hierarchical data set to ensure balanced and efficient parallel processing into the future.

Implementations of the subject matter and the operations described in this specification may be implemented in digital electronic circuitry, or in computer software, firmware, or hardware, including the structures disclosed in this specification and their structural equivalents, or in combinations of one or more of them. Implementations of the subject matter described in this specification may be implemented as one or more computer programs, i.e., one or more modules of computer program instructions, encoded on one or more computer storage medium for execution by, or to control the operation of, data processing apparatus. Alternatively or in addition, the program instructions may be encoded on an artificially generated propagated signal (e.g., a machine-generated electrical, optical, or electromagnetic signal) that is generated to encode information for transmission to suitable receiver apparatus for execution by a data processing apparatus. A computer storage medium may be, or be included in, a computer-readable storage device, a computer-readable storage substrate, a random or serial access memory array or device, or a combination of one or more of them. Moreover, while a computer storage medium is not a propagated signal, a computer storage medium may be a source or destination of computer program instructions encoded in an artificially generated propagated signal. The computer storage medium may also be, or be included in, one or more separate components or media (e.g., multiple CDs, disks, or other storage devices). Accordingly, the computer storage medium is both tangible and non-transitory.

The operations described in this disclosure may be implemented as operations performed by a data processing apparatus on data stored on one or more computer-readable storage devices or received from other sources.

The term "client or "server" include all kinds of apparatus, devices, and machines for processing data, including by way of example a programmable processor, a computer, a system on a chip, or multiple ones, or combinations, of the foregoing. The apparatus may include special purpose logic circuitry, e.g., a field programmable gate array (FPGA) or an application specific integrated circuit (ASIC). The apparatus may also include, in addition to hardware, code that creates an execution environment for the computer program in question (e.g., code that constitutes processor firmware, a protocol stack, a database management system, an operating system, a cross-platform runtime environment, a virtual machine, or a combination of one or more of them). The apparatus and execution environment may realize various different computing model infrastructures, such as web services, distributed computing and grid computing infrastructures.

The systems and methods of the present disclosure may be completed by any computer program. A computer program (also known as a program, software, software application, script, or code) may be written in any form of programming language, including compiled or interpreted languages, declarative or procedural languages, and it may be deployed in any form, including as a stand alone program or as a module, component, subroutine, object, or other unit suitable for use in a computing environment. A computer program may, but need not, correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one computer or on multiple computers that are located at one site or distributed across multiple sites and interconnected by a communication network.

The processes and logic flows described in this specification may be performed by one or more programmable processors executing one or more computer programs to perform actions by operating on input data and generating output. The processes and logic flows may also be performed by, and apparatus may also be implemented as, special purpose logic circuitry (e.g., an FPGA or an ASIC).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data (e.g., magnetic, magneto-optical disks, or optical disks). However, a computer need not have such devices. Moreover, a computer may be embedded in another device (e.g., a mobile telephone, a personal digital assistant (PDA), a mobile audio or video player, a game console, a Global Positioning System (GPS) receiver, or a portable storage device (e.g., a universal serial bus (USB) flash drive), etc.). Devices suitable for storing computer program instructions and data include all forms of non volatile memory, media and memory devices, including by way of example semiconductor memory devices (e.g., EPROM, EEPROM, and flash memory devices; magnetic disks, e.g., internal hard disks or removable disks; magneto-optical disks; and CD ROM and DVD-ROM disks). The processor and the memory may be supplemented by, or incorporated in, special purpose logic circuitry.

To provide for interaction with a user, implementations of the subject matter described in this specification may be implemented on a computer having a display device (e.g., a CRT (cathode ray tube), LCD (liquid crystal display), OLED (organic light emitting diode), TFT (thin-film transistor), or other flexible configuration, or any other monitor for displaying information to the user and a keyboard, a pointing device, e.g., a mouse, trackball, etc., or a touch screen, touch pad, etc.) by which the user may provide input to the computer. Other kinds of devices may be used to provide for interaction with a user as well; for example, feedback provided to the user may be any form of sensory feedback (e.g., visual feedback, auditory feedback, or tactile feedback), and input from the user may be received in any form, including acoustic, speech, or tactile input. In addition, a computer may interact with a user by sending documents to and receiving documents from a device that is used by the user; for example, by sending web pages to a web browser on a user's client device in response to requests received from the web browser.

Implementations of the subject matter described in this disclosure may be implemented in a computing system that includes a back-end component (e.g., as a data server), or that includes a middleware component (e.g., an application server), or that includes a front end component (e.g., a client computer) having a graphical user interface or a web browser through which a user may interact with an implementation of the subject matter described in this disclosure, or any combination of one or more such back end, middleware, or front end components. The components of the system may be interconnected by any form or medium of digital data communication (e.g., a communication network). Examples of communication networks include a LAN and a WAN, an inter-network (e.g., the Internet), and peer-to-peer networks (e.g., ad hoc peer-to-peer networks).

While this specification contains many specific implementation details, these should not be construed as limitations on the scope of any disclosures or of what may be claimed, but rather as descriptions of features specific to particular implementations of particular disclosures. Certain features that are described in this disclosure in the context of separate implementations may also be implemented in combination in a single implementation. Conversely, various features that are described in the context of a single implementation may also be implemented in multiple implementations separately or in any suitable subcombination. Moreover, although features may be described above as acting in certain combinations and even initially claimed as such, one or more features from a claimed combination may in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems may generally be integrated together in a single software product or packaged into multiple software products embodied on one or more tangible media.

The features disclosed herein may be implemented on a smart television module (or connected television module, hybrid television module, etc.), which may include a processing circuit configured to integrate internet connectivity with more traditional television programming sources (e.g., received via cable, satellite, over-the-air, or other signals). The smart television module may be physically incorporated into a television set or may include a separate device such as a set-top box, Blu-ray or other digital media player, game console, hotel television system, and other companion device. A smart television module may be configured to allow viewers to search and find videos, movies, photos and other content on the web, on a local cable TV channel, on a satellite TV channel, or stored on a local hard drive. A set-top box (STB) or set-top unit (STU) may include an information appliance device that may contain a tuner and connect to a television set and an external source of signal, turning the signal into content which is then displayed on the television screen or other display device. A smart television module may be configured to provide a home screen or top level screen including icons for a plurality of different applications, such as a web browser and a plurality of streaming media services (e.g., Netflix, Vudu, Hulu, etc.), a connected cable or satellite media source, other web "channels", etc. The smart television module may further be configured to provide an electronic programming guide to the user. A companion application to the smart television module may be operable on a mobile computing device to provide additional information about available programs to a user, to allow the user to control the smart television module, etc. In alternate implementations, the features may be implemented on a laptop computer or other personal computer, a smartphone, other mobile phone, handheld computer, a tablet PC, or other computing device.

Thus, particular implementations of the subject matter have been described. Other implementations are within the scope of the following claims. In some cases, the actions recited in the claims may be performed in a different order and still achieve desirable results. In addition, the processes depicted in the accompanying figures do not necessarily require the particular order shown, or sequential order, to achieve desirable results. In certain implementations, multitasking and parallel processing may be advantageous.

The construction and arrangement of the systems and methods as shown in the various exemplary implementations are illustrative only. Although only a few implementations have been described in detail in this disclosure, many modifications are possible (e.g., variations in sizes, dimensions, structures, shapes and proportions of the various elements, values of parameters, mounting arrangements, use of materials, colors, orientations, etc.). For example, the position of elements may be reversed or otherwise varied and the nature or number of discrete elements or positions may be altered or varied. Accordingly, all such modifications are intended to be included within the scope of the present disclosure. The order or sequence of any process or method steps may be varied or re-sequenced according to alternative implementations. Other substitutions, modifications, changes, and omissions may be made in the design, operating conditions and arrangement of the exemplary implementations without departing from the scope of the present disclosure.

The present disclosure contemplates methods, systems and program products on any machine-readable media for accomplishing various operations. The implementations of the present disclosure may be implemented using existing computer processors, or by a special purpose computer processor for an appropriate system, incorporated for this or another purpose, or by a hardwired system. Implementations within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. When information is transferred or provided over a network or another communications connection (either hardwired, wireless, or a combination of hardwired or wireless) to a machine, the machine properly views the connection as a machine-readable medium. Thus, any such connection is properly termed a machine-readable medium. Combinations of the above are also included within the scope of machine-readable media. Machine-executable instructions include, for example, instructions and data which cause a general purpose computer, special purpose computer, or special purpose processing machines to perform a certain function or group of functions.

Although the figures show a specific order of method steps, the order of the steps may differ from what is depicted. Also two or more steps may be performed concurrently or with partial concurrence. Such variation will depend on the software and hardware systems chosen and on designer choice. All such variations are within the scope of the disclosure. Likewise, software implementations could be accomplished with standard programming techniques with rule based logic and other logic to accomplish the various connection steps, processing steps, comparison steps and decision steps.

What is claimed is:

1. A method for serving a request for hierarchical data, the method comprising:

receiving, at a sharding service component of one or more data processing sites that each include one or more machines, a request for hierarchical data stored in one or more databases, the request including an indication of a particular data hierarchy;

identifying, by the sharding service component, one or more entity count records corresponding to the particular data hierarchy, the entity count records indicating a distribution of the hierarchical data within the data hierarchy;

splitting, by the sharding service component, the request for hierarchical data into a plurality of sharded requests based on the distribution of the hierarchical data indicated by the one or more entity count records, wherein splitting the request for hierarchical data into the plurality of sharded requests comprises recursively splitting a sharded request into a plurality of sub-sharded requests in response to a determination that a sharded request is associated with a shard that has a size exceeding a maximum threshold value;

assigning the plurality of sharded requests to one or more of the one or more data processing sites for processing at least a subset of the sharded requests in parallel; and reporting a combined result of processing the plurality of sharded requests.

2. The method of claim 1, wherein the data hierarchy represents an account associated with a content provider and comprises at least one of: a set of keywords and a set of content items associated with the content provider.

3. The method of claim 1, further comprising:
assigning the hierarchical data to a plurality of data shards based on the distribution of the hierarchical data indicated by the one or more entity count records;
wherein each of the sharded requests corresponds to one of the plurality of data shards.

4. The method of claim 1, wherein each of the entity count records corresponds to a node of the data hierarchy and includes an indication of a number of data entries at one or more lower levels the data hierarchy within the corresponding node.

5. The method of claim 1, wherein the one or more entity count records comprise:
a top level entity count record including an indication of a total number of data entries at a lowest level of the data hierarchy and an indication of a number of nodes at each lower level of the data hierarchy other than the lowest level.

6. The method of claim 1, further comprising:
storing in an active memory of the sharding service component an entity count record associated with a top level node of the data hierarchy and a plurality of entity count records associated with one or more lower level nodes of the data hierarchy; and
periodically updating the entity count records stored in the active memory of the sharding service component to reflect a current distribution of the hierarchical data.

7. The method of claim 1, further comprising:
attaching a timestamp to each of the plurality of sharded requests, the timestamp indicating a version of the hierarchical data to use in processing the request.

8. The method of claim 1, wherein splitting the request for hierarchical data into a plurality of sharded requests further comprises:
determining a level of the data hierarchy at which to split the request;
identifying a number of nodes of the data hierarchy at the determined level using the entity count records; and
splitting the request for hierarchical data into a plurality of sharded requests, each of the sharded requests corresponding to one of the identified nodes of the data hierarchy.

9. The method of claim 8, wherein determining the level of the data hierarchy at which to split the request comprises:
determining a target number of shards into which to split the hierarchical data;
using the entity count records to identify a level of the data hierarchy having a number of nodes closest to the target number of shards; and
determining to split the request at the identified level of the data hierarchy.

10. The method of claim 8, wherein determining the level of the data hierarchy at which to split the request comprises:
using the entity count records to identify a first set of nodes at a first level of the data hierarchy and a first distribution of the hierarchical data between the first set of nodes;
using the entity count records to identify a second set of nodes at a second level of the data hierarchy and a second distribution of the hierarchical data between the second set of nodes; and
determining to split the request at either the first level of the data hierarchy or the second level of the data hierarchy based on which of the first distribution and the second distribution is most evenly distributed.

11. The method of claim 1, wherein splitting the request for hierarchical data into a plurality of sharded requests further comprises:
combining two or more sharded requests into a single sharded request in response to a determination that at least one of the two or more sharded requests is associated with a shard that has a size less than a minimum threshold value.

12. A system for serving a request for hierarchical data, the system comprising:
a sharding service component of one or more data processing sites that each include one or more machines, the sharding service component being configured to:
receive a request for hierarchical data stored in one or more databases, the request including an indication of a particular data hierarchy;
identify one or more entity count records corresponding to the particular data hierarchy, the entity count records indicating a distribution of the hierarchical data within the data hierarchy;
split the request for hierarchical data into a plurality of sharded requests based on the distribution of the hierarchical data indicated by the one or more entity count records, wherein splitting the request for hierarchical data into the plurality of sharded requests comprises recursively splitting a sharded request into a plurality of sub-sharded requests in response to a determination that a sharded request is associated with a shard that has a size exceeding a maximum threshold value;
assign the plurality of sharded requests to one or more of the one or more data processing sites for processing at least a subset of the sharded requests in parallel; and
report a combined result of processing the plurality of sharded requests.

13. The system of claim 12, wherein each of the entity count records corresponds to a node of the data hierarchy and includes an indication of a number of data entries at a lowest level of the data hierarchy within the corresponding node.

14. The system of claim 12, wherein the sharding service component is further configured to:

store in an active memory of the sharding service component an entity count record associated with a top level node of the data hierarchy and a plurality of entity count records associated with one or more lower level nodes of the data hierarchy; and periodically update the entity count records stored in the active memory of the sharding service component to reflect a current distribution of the hierarchical data.

15. The system of claim 12, wherein splitting the request for hierarchical data into a plurality of sharded requests comprises:

determining a target number of shards into which to split the hierarchical data;

using the entity count records to identify a level of the data hierarchy having a number of nodes closest to the target number of shards; and splitting the request at the identified level of the data hierarchy.

16. The system of claim 12, wherein splitting the request for hierarchical data into a plurality of sharded requests comprises:

determining a level of the data hierarchy on which to split the request;

identifying a number of nodes of the data hierarchy at the determined level; and splitting the request for hierarchical data into a plurality of sharded requests, each of the sharded requests corresponding to one of the identified nodes of the data hierarchy.

17. A system for serving a request for hierarchical data, the system comprising:

a sharding service component of one or more data processing sites that each include one or more machines, the sharding service component being configured to store one or more entity count records in active memory of the sharding service component, wherein each of the entity count records corresponds to a node of a data hierarchy and includes an indication of a number of data entries at one or more lower levels of the data hierarchy within the corresponding node;

wherein the sharding service component is configured to split a request for data represented by the data hierarchy into a plurality of sharded requests based on a distribution of the data indicated by the one or more entity count records stored in active memory, wherein splitting the request for hierarchical data into the plurality of sharded requests comprises recursively splitting a sharded request into a plurality of sub-sharded requests in response to a determination that a sharded request is associated with a shard that has a size exceeding a maximum threshold value.

18. The system of claim 17, wherein the sharding service component is further configured to:

periodically update the entity count records stored in the active memory of the sharding service component to reflect a current distribution of the hierarchical data.

19. The system of claim 17, wherein splitting the request into a plurality of sharded requests further comprises:

determining a target number of shards into which to split the hierarchical data;

using the entity count records to identify a level of the data hierarchy having a number of nodes closest to the target number of shards; and splitting the request for hierarchical data into a plurality of sharded requests, each of the sharded requests corresponding to one of the nodes of the identified level of the data hierarchy.

\* \* \* \* \*